US012145680B2

(12) United States Patent
Aikyo

(10) Patent No.: US 12,145,680 B2
(45) Date of Patent: Nov. 19, 2024

(54) SADDLED VEHICLE AND RIDER PROTECTION EQUIPMENT

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/578,035

(22) PCT Filed: Jul. 27, 2021

(86) PCT No.: PCT/JP2021/027786
§ 371 (c)(1),
(2) Date: Jan. 10, 2024

(87) PCT Pub. No.: WO2023/007592
PCT Pub. Date: Feb. 2, 2023

(65) Prior Publication Data
US 2024/0317347 A1    Sep. 26, 2024

(51) Int. Cl.
*B62J 27/20* (2020.01)

(52) U.S. Cl.
CPC .................... *B62J 27/20* (2020.02)

(58) Field of Classification Search
CPC ............. B62J 27/20; B60R 21/16; B60R 2021/23382; B60R 2021/161;
(Continued)

(56) References Cited

U.S. PATENT DOCUMENTS

| 5,938,231 A | 8/1999 | Yamazaki |
| 2006/0175811 A1* | 8/2006 | Goto ................. B62J 27/20 |
| | | 2/456 |

(Continued)

FOREIGN PATENT DOCUMENTS

| CA | 2901892 A1 * | 8/2014 | ........... A41D 13/018 |
| GB | 2510859 A  * | 8/2014 | ........... A41D 13/018 |

(Continued)

OTHER PUBLICATIONS

"International Preliminary Report on Patentability", International Application No. PCT/JP2021/027786, Date of mailing: Feb. 1, 2024, 4 pages.

(Continued)

*Primary Examiner* — Paul N Dickson
*Assistant Examiner* — Matthew D Lee
(74) *Attorney, Agent, or Firm* — Rankin, Hill & Clark LLP

(57) ABSTRACT

In a saddled vehicle and rider protection equipment, an airbag is enabled to protect a rider from the front and the rear with a simple structure. The saddled vehicle includes a seat for a rider and an airbag provided behind the seat or in a rear part of the seat; the airbag includes an upwardly deploying portion that is deployed upward when deployed, and a second deploying portion that branches and extends from a portion of the upwardly deploying portion, the second deploying portion includes an forwardly extending portion that extends outward in the vehicle width direction from the upwardly deploying portion and then extends forward, and an inner bending portion that bends inward in the vehicle width direction from the forwardly extending portion.

15 Claims, 21 Drawing Sheets

(58) Field of Classification Search
CPC .... B60R 2021/23386; A41D 2600/104; A41D 2600/102
See application file for complete search history.

(56) References Cited

U.S. PATENT DOCUMENTS

| | | |
|---|---|---|
| 2011/0062690 A1 | 3/2011 | Kizaki |
| 2024/0008579 A1* | 1/2024 | Honore .................. A62B 99/00 |

FOREIGN PATENT DOCUMENTS

| | | | |
|---|---|---|---|
| JP | 09066789 A * | 3/1997 | ........... A41D 13/018 |
| JP | H10-6901 A | 1/1998 | |
| JP | H11-129961 A | 5/1999 | |
| JP | 2003-312569 A | 11/2003 | |
| JP | 2008-121159 A | 5/2008 | |
| JP | 2011-063054 A | 3/2011 | |
| JP | 2011-173466 A | 9/2011 | |
| JP | 2011173566 A * | 9/2011 | |
| JP | 2016-040171 A | 3/2016 | |
| WO | WO-2020064079 A1 * | 4/2020 | ......... B60R 21/0132 |

OTHER PUBLICATIONS

International Search Report Corresponding to International Application No. PCT/JP2021/027786, dated Oct. 12, 2021, 4 pages.
International Preliminary Report on Patentability Corresponding to International Application No. PCT/JP2021/027786, dated Apr. 28, 2022, 9 pages.

\* cited by examiner

SADDLED VEHICLE AND RIDER PROTECTION EQUIPMENT

TECHNICAL FIELD

The present invention relates to a saddled vehicle and rider protection equipment.

BACKGROUND ART

Conventionally, a saddled vehicle has been known that includes an airbag that protects a rider from the rear (for example, see Patent Literature 1). Furthermore, a saddled vehicle has been known that includes an airbag that protects a rider from the front (for example, see Patent Literature 2).

CITATION LIST

Patent Literature

[Patent Literature 1]
  Japanese Patent Laid-Open No. 2011-173466
[Patent Literature 2]
  Japanese Patent Laid-Open No. 10-6901

SUMMARY OF INVENTION

Technical Problem

It is desirable to protect the rider from the front and the rear with airbags, but if airbags are provided separately on the front and the rear sides of the rider as in the related art described above, the structure is more complicated.

The present invention has been made in view of the above-mentioned circumstances, and an object of the present invention is to enable a saddled vehicle and rider protection equipment to protect a rider from the front and the rear using an airbag with a simple structure.

Solution to Problem

A saddled vehicle includes: a seat for a rider; and an airbag provided behind the seat or in a rear part of the seat, in which the airbag includes an upwardly deploying portion that is deployed upward when deployed, and a second deploying portion that branches and extends from a portion of the upwardly deploying portion, the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and the second deploying portion includes an inner bending portion that bends inward in the vehicle width direction from the forwardly extending portion or the second forwardly extending portion.

Rider protection equipment includes: rider equipment, worn by a rider riding on a vehicle; and an airbag, in which the airbag is supported by the rider equipment and is located on a rear surface side of a torso of the rider, the airbag includes an upwardly deploying portion that is deployed upward when deployed, and a second deploying portion that branches and extends from a portion of the upwardly deploying portion, the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and the second deploying portion includes an inner bending portion that bends inward in the vehicle width direction from the forwardly extending portion or the second forwardly extending portion.

Advantageous Effect of Invention

The airbag can protect the rider from the front and the rear with a simple structure.

DESCRIPTION OF EMBODIMENTS

Figure 1:
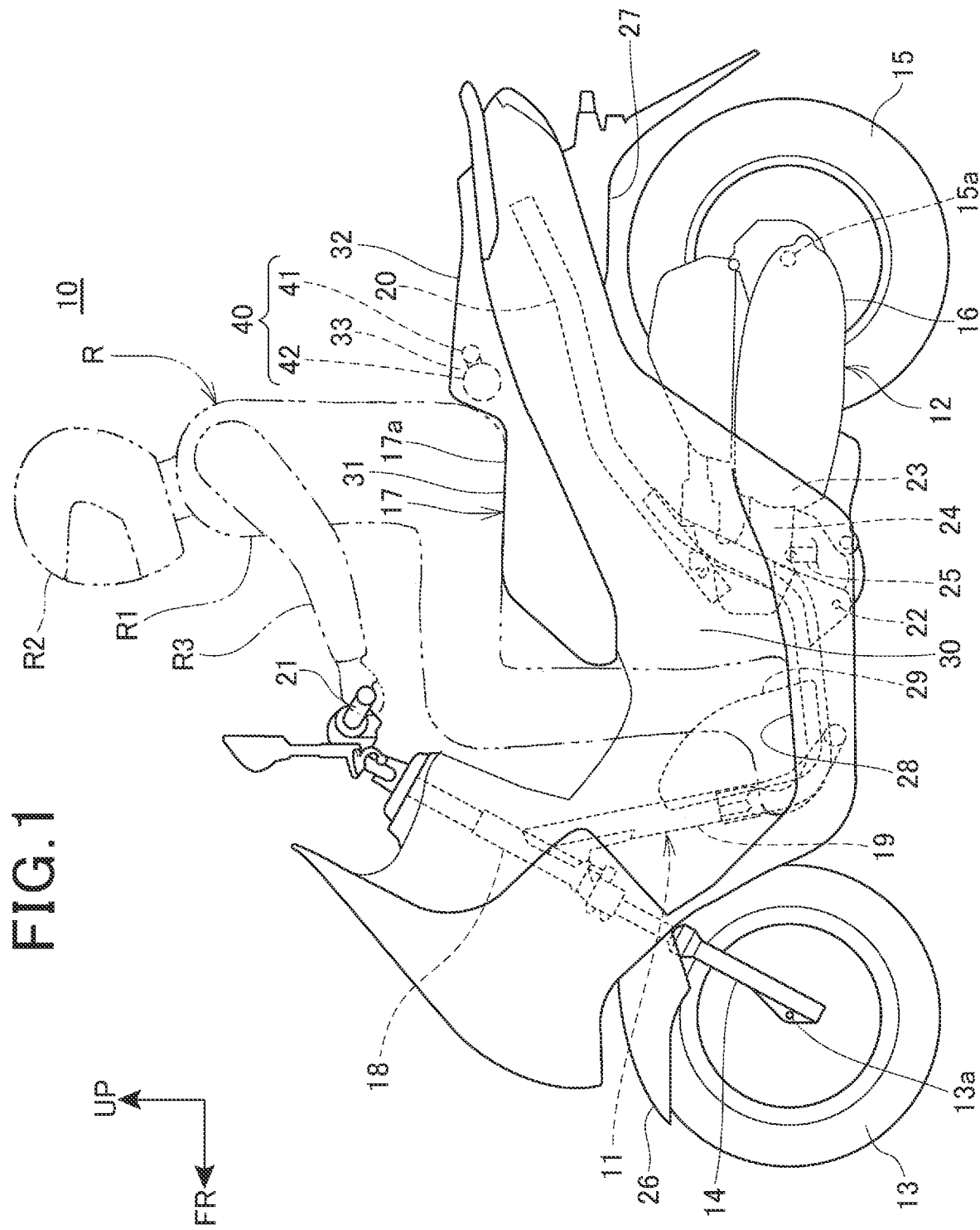
FIG. 1 is a side view of a saddled vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddled vehicle 10 according to an embodiment of the present invention.

The saddled vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddled vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddled vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddled vehicle 10 is a scooter motorcycle including a floor-like step 28 in a lower front side of the seat 17. The power unit 12 is a unit swing engine in which the above internal combustion engine and the swing arm 16 are integrally formed. The power unit 12 is disposed directly below the seat 17 and the rear frame 20.

The saddled vehicle 10 includes a vehicle body cover 30 covering the vehicle body such as the vehicle body frame 11 and the power unit 12.

The seat 17 is provided behind the handle 21 and above the rear frame 20. The seat 17 includes a front side seat 31 on which a driver R (rider) sits, and a rear side seat 32 disposed behind the front side seat 31.

The rear side seat 32 is formed higher than the front side seat 31 in a stepped manner. A pillion passenger can sit on the rear side seat 32 and luggage can be placed thereon.

The saddled vehicle 10 includes an airbag device 40 that protects the driver R.

The airbag device 40 is disposed in a rear part of the seat 17 and behind the front side seat 31.

Specifically, the airbag device 40 is stored in an airbag storage portion 33 provided inside the front part of the rear side seat 32. The airbag device 40 is disposed behind the seating position 17a of the driver R on the seat 17.

The airbag device 40 includes an inflator 41, and an airbag 42 that is inflated by gas released by the inflator 41. The airbag 42 is stored in the airbag storage portion 33 in a folded state.

The airbag 42 is disposed behind the seating position 17a, and is disposed at the center in the vehicle width direction like the front wheel 13 and the seat 17.

The saddled vehicle 10 includes an acceleration sensor (not shown) that detects an impact acting on the saddled vehicle 10. This acceleration sensor is electrically connected to a control unit (not shown) of the saddled vehicle 10, and the control unit is electrically connected to the inflator 41. The control unit determines whether the airbag device 40 to be operated or not based on the detected acceleration. When operating the airbag device 40, the control unit operates the inflator 41 to release gas into the airbag 42. The airbag 42 is inflated and deployed by gas pressure.

When inflated, the airbag 42 pushes away a cover (not shown) that covers the airbag storage portion 33 from above to be deployed upward.

Figure 2:
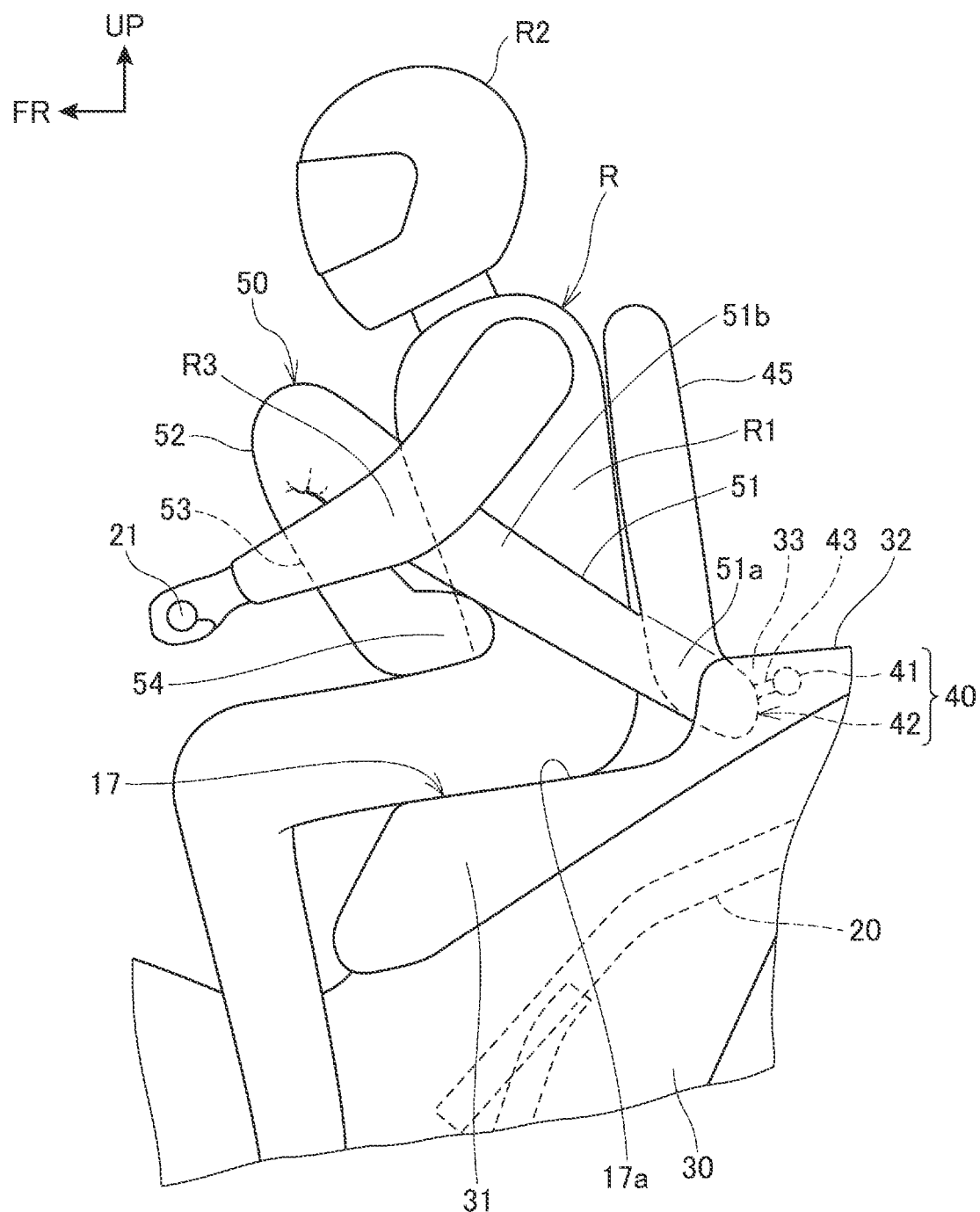
FIG. 2 is a left side view showing a state in which an airbag is deployed to protect a driver.
Figure 3:
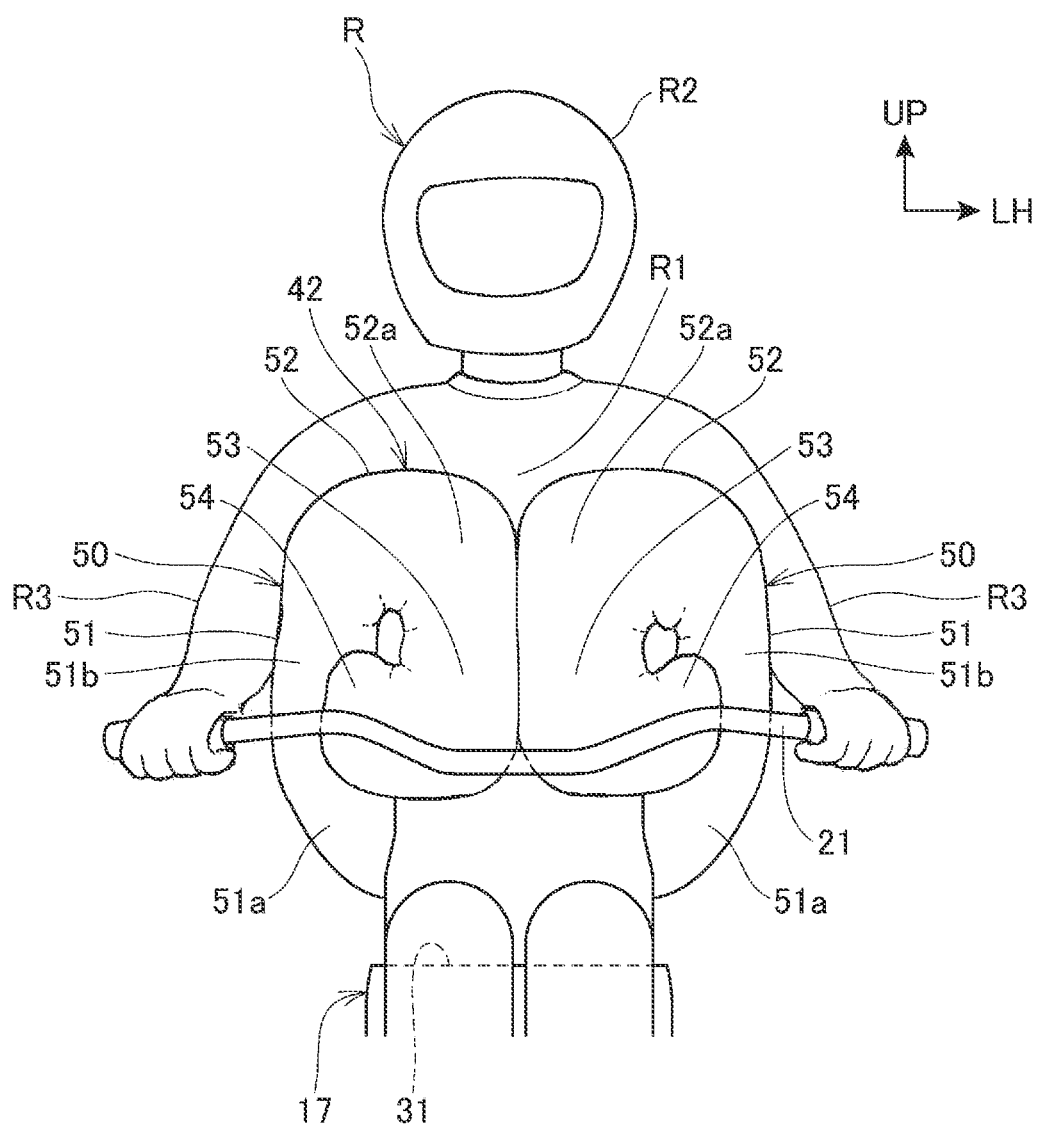
FIG. 3 is a front view of the state, seen from a front side, in which the airbag is deployed to protect the driver.
Figure 4:
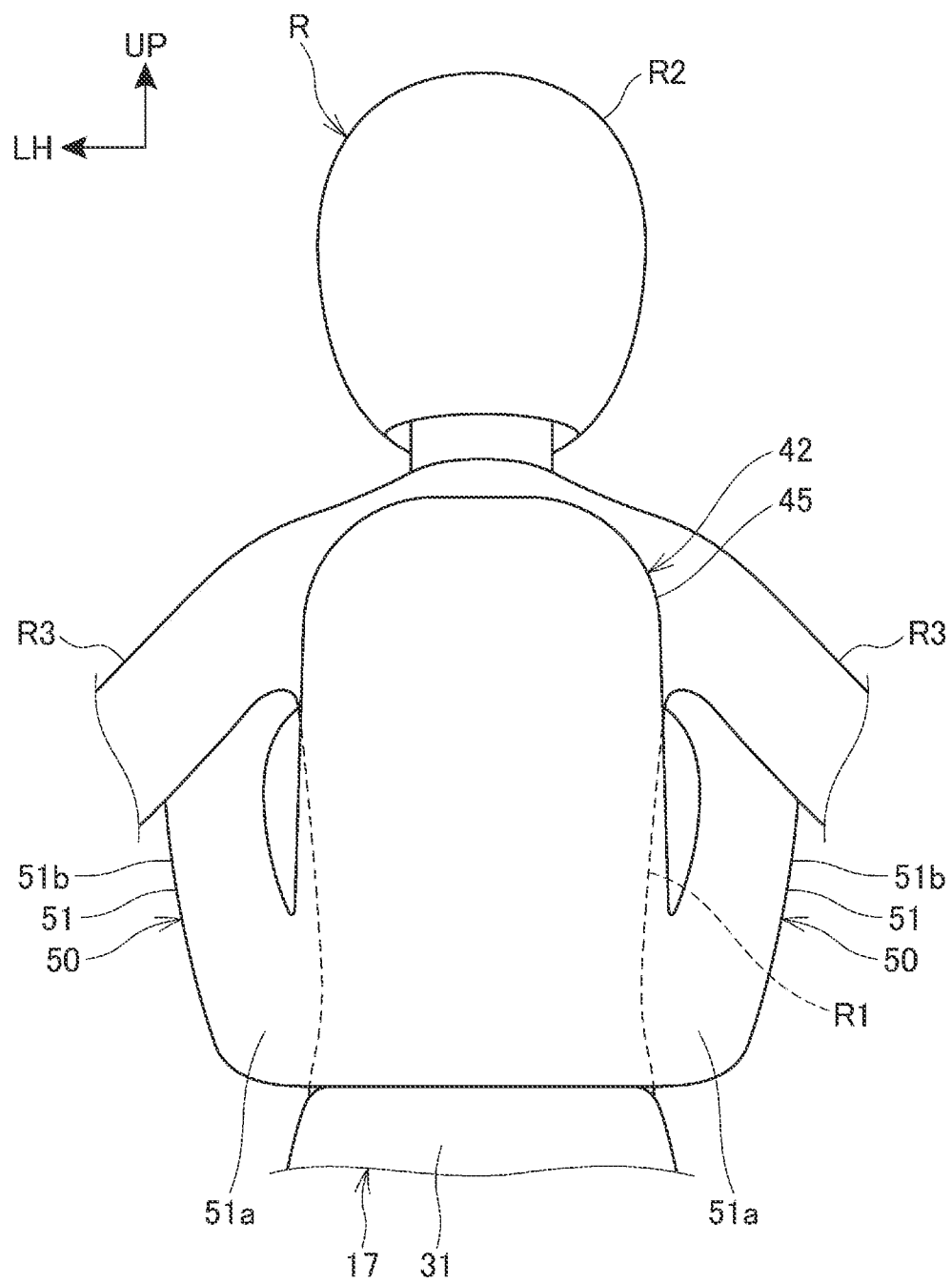
FIG. 4 is a rear view of the state, seen from the rear side, in which the airbag is deployed to protect the driver.
Figure 5:
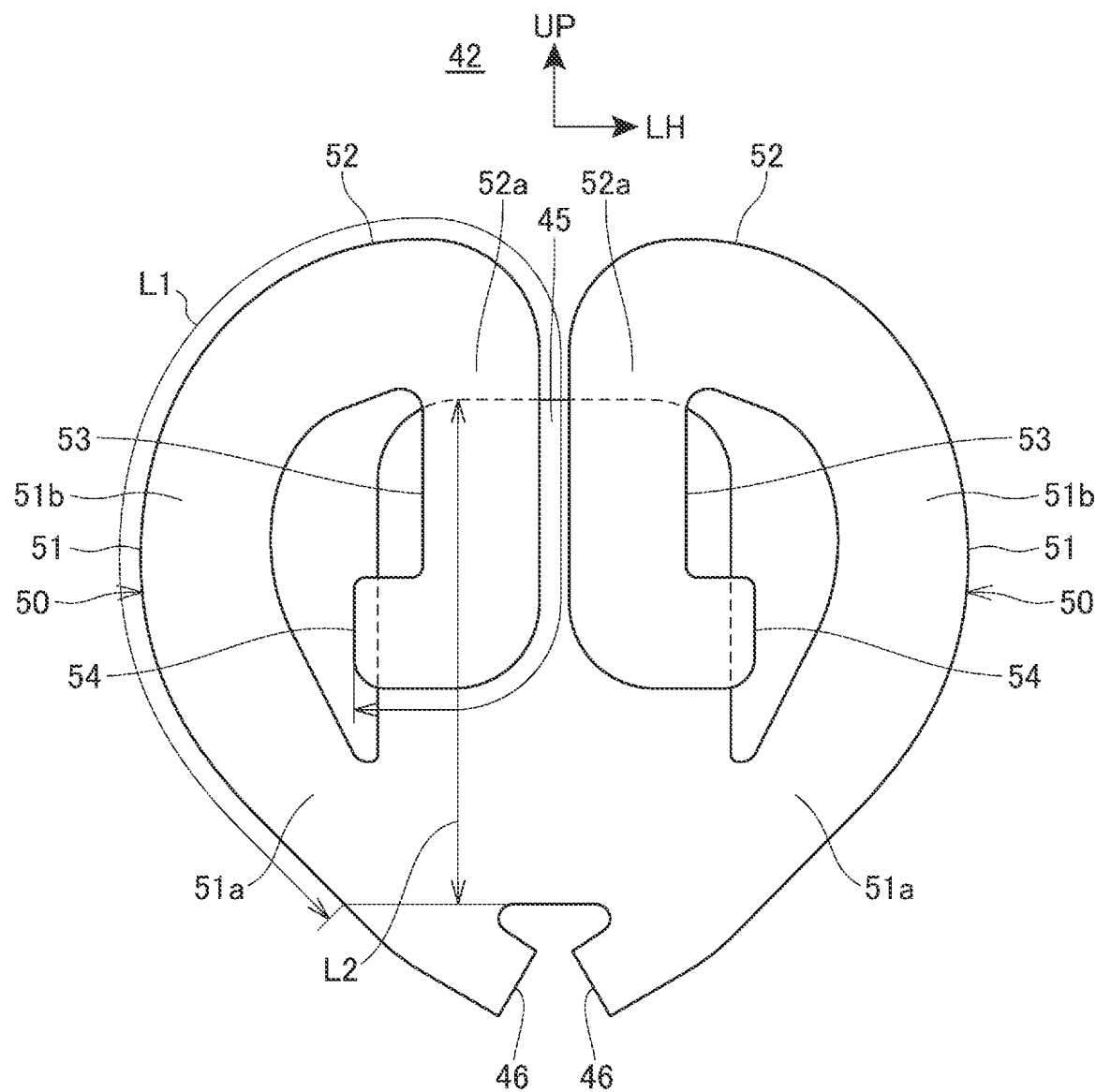
FIG. 5 is a front view of the deployed airbag as seen from the front side.

FIG. 2 is a left side view showing a state in which the airbag 42 is deployed to protect the driver R. FIG. 3 is a front view of the state, seen from the front side, in which the airbag 42 is deployed to protect the driver R. FIG. 4 is a rear view of the state, seen from the rear side, in which the airbag 42 is deployed to protect the driver R. FIG. 5 is a front view of the deployed airbag 42 as seen from the front side.

When deployed, the airbag 42 includes an upwardly deploying portion 45 that is deployed upward from the airbag storage portion 33, and a pair of left and right second deploying portions 50 that branch from a portion of the upwardly deploying portion 45 and extend forward.

Furthermore, the airbag 42 includes inflator connecting portions 46 (FIG. 5) connected to the inflator 41 at the lower end portion of the upwardly deploying portion 45.

The upwardly deploying portion 45 has a rectangular shape extending upward from the airbag storage portion 33 as seen from the rear side, and is longer in the up-down direction than in the vehicle width direction (left-right direction).

The upwardly deploying portion 45 is disposed at the center in the vehicle width direction, and covers substantially the entire rear surface of the torso R1 of the driver R from the rear. The upwardly deploying portion 45 extends upward to the vicinity of the head R2 of the driver R.

The inflator connecting portions 46 are inlets for gas that deploy the airbag 42, and the gas released by the inflator 41 flows from the inflator connecting portions 46 into the lower end portion of the upwardly deploying portion 45. This gas flows upward in the upwardly deploying portion 45.

The second deploying portions 50 have rod shapes that extend forward respectively from the lateral side portions located on the outer sides in the vehicle width direction of the upwardly deploying portion 45. Each second deploying portion 50 has a rod shape that is thinner than the upwardly deploying portion 45.

The second deploying portion 50 extends from the lateral side portion in the lower part of the upwardly deploying portion 45. The proximal end portion of the second deploying portion 50 communicates with the inside of the upwardly deploying portion 45.

The left and right second deploying portions 50 are provided symmetrically with respect to the center in the vehicle width direction of the upwardly deploying portion 45.

Specifically, each second deploying portion 50 includes a forwardly extending portion 51 that extends outward in the vehicle width direction from the lower end portion of the upwardly deploying portion 45 and then extends forward, and an inner bending portion 52 that bends inward in the vehicle width direction from the forwardly extending portion 51 and extends inward in the vehicle width direction.

Additionally, the second deploying portion 50 includes a downwardly extending portion 53 that bends from the inner bending portion 52 and extends downward, and a folded-back portion 54 that is folded back from the downwardly extending portion 53 toward the forwardly extending portion 51.

Each forwardly extending portion 51 of the second deploying portion 50 includes a laterally extending portion 51a extending outward in the vehicle width direction from the lower end portion of the upwardly deploying portion 45, and a forwardly extending portion body 51b that extends forward from the laterally extending portion 51a. The laterally extending portion 51a extends outward in the vehicle width direction relative to the torso R1.

The laterally extending portion 51a is the proximal end portion of the second deploying portion 50. Part of the gas, which has flowed from the inflator connecting portions 46 into the upwardly deploying portion 45, flows from the laterally extending portion 51a into the second deploying portion 50.

Each forwardly extending portion body 51b has a rod shape that extends diagonally upward and forward from the laterally extending portion 51a in a vehicle side view.

The forwardly extending portion body 51b: extends forward and upward from the laterally extending portion 51a, through below the arm R3 and the outer lateral side of the torso R1 of the driver R sitting on the seat 17 and grasping the handle 21; and then extends to the front side of the torso R1 through between the arm R3 and the torso R1.

The forwardly extending portion body 51b extends to be progressively located outward in the vehicle width direction as the forwardly extending portion body 51b extends forward from the laterally extending portion 51a.

Each inner bending portion 52 extends inward in the vehicle width direction from the front end portion of the forwardly extending portion 51. The inner bending portion 52 is located above the handle 21. The inner bending portion 52 turns to the front surface side of the torso R1 and is in contact with the front surface of the torso R1.

Each downwardly extending portion 53 extends downward from the inner end portion 52a in the vehicle width direction of the inner bending portion 52. The downwardly extending portion 53 extends downward along the front surface of the torso R1.

Each folded-back portion 54 is folded back rearward from the lower end portion of the downwardly extending portion 53. The folded-back portion 54 extends toward the forwardly extending portion body 51b, which extends upward toward the front behind the folded-back portion 54, and comes into contact with the forwardly extending portion body 51b from the front.

With the airbag 42 deployed, the airbag 42 surrounds the driver R and is in close contact with the driver R. Specifically, the upwardly deploying portion 45 covers the torso R1 from the rear and protects the torso R1 from the rear.

The left and right forwardly extending portions 51 cover the torso R1 from the outer lateral sides below the arms R3 and protect the torso R1 from the outer lateral sides.

Each inner bending portion 52 covers the upper part of the front surface of the torso R1 from the front and protects the upper part of the front surface of the torso R1 from the front.

Each downwardly extending portion 53 covers the front surface of the torso R1 from the front and protects the torso R1 from the front.

Each folded-back portion 54 covers the lower part of the torso R1 below the forwardly extending portion body 51b and protects the torso R1 from the front and outer lateral side. Furthermore, the folded-back portion 54 is in contact with the forwardly extending portion body 51b from the front, to suppress deformation of the overall shape of the second deploying portion 50 and maintain the second deploying portion 50 in an appropriate shape. Furthermore, the folded-back portion 54 is also in contact with the driver R, allowing the second deploying portion 50 to be maintained in an appropriate shape.

In the airbag 42, the upwardly deploying portion 45 that protects the torso R1 from the rear is connected with the inner bending portions 52 that protect the torso R1 from the front, respectively by the forwardly extending portions 51. Therefore, one airbag 42 can protect the torso R1 from the rear and the front.

The airbag 42 has the forwardly extending portions 51 passing between each arm R3 and the torso R1, so that the airbag 42 can prevent the arms R3 and the torso R1 from getting in the way of deployment of the forwardly extending portions 51, and is properly in close contact with the driver via the left and right forwardly extending portions 51.

The airbag 42 sandwiches the driver R in the vehicle front-rear direction between: the inner bending portions 52 and the downwardly extending portions 53; and the upwardly deploying portion 45. Therefore, the airbag 42 is properly in close contact with the driver R.

With reference to FIGS. 3 and 4, in a state in which the airbag 42 is deployed to the driver R, at least part of each inner bending portion 52 overlaps the upwardly deploying portion 45 in the vehicle front-rear direction. Furthermore, in a state in which the airbag 42 is deployed to the driver R, at least part of each downwardly extending portion 53 overlaps the upwardly deploying portion 45 in the vehicle front-rear direction.

In other words, in the front view shown in FIG. 3, the inner bending portions 52 and the downwardly extending portions 53 overlap the upwardly deploying portion 45 from the front. Therefore, the inner bending portions 52 and the downwardly extending portions 53, and the upwardly deploying portion 45 can sandwich the driver R between the front and the rear, allowing the airbag 42 to be effectively in close contact with the driver R.

Each second deploying portion 50 is rod-shaped and has a small volume, resulting in quick deployment.

With reference to FIG. 5, with the airbag 42 deployed, the length L1 of each second deploying portion 50 in the deploying direction is longer than the length L2 of the upwardly deploying portion 45 in the deploying direction.

The airbag device 40 is provided with a separating mechanism 43 (FIG. 2) that separates the airbag 42 from the inflator 41 after the airbag 42 is deployed. The separating mechanism 43 is operated, for example, by the pressure of gas within the airbag 42, to separate the airbag 42 from the inflator 41. Alternatively, the separating mechanism 43 may melt part of the airbag 42 with heat to separate the airbag 42 from the inflator 41.

When the inflator 41 operates and the airbag 42 is deployed, the airbag 42 comes into close contact with the driver R and is separated from the inflator 41. Therefore, after the airbag 42 is deployed, the airbag 42 is prevented from being pulled by the inflator 41 and being shifted from the driver R.

The separating mechanism 43 includes a check valve (not shown) that suppresses the outflow of gas from the separated airbag 42. Therefore, after being separated, the airbag 42 maintains the inflated state and is properly in close contact with the driver R.

As described above, according to the embodiment to which the present invention is applied, the saddled vehicle 10 includes the seat 17 for a rider and the airbag 42 provided in a rear part of the seat 17; the airbag 42 includes an upwardly deploying portion 45 that is deployed upward when deployed, and the second deploying portions 50 that branch and extend from the lower end portion that is a portion of the upwardly deploying portion 45; and each second deploying portion 50 includes the forwardly extending portion 51 that extends outward in the vehicle width direction from the upwardly deploying portion 45 and then extends forward, and an inner bending portion 52 that bends inward in the vehicle width direction from the forwardly extending portion 51.

This configuration allows the upwardly deploying portion 45 to protect the driver R from the rear, and allows the inner bending portions 52, each of which bends inward in the vehicle width direction from the forwardly extending portion 51 extending forward from the upwardly deploying portion 45, to protect the driver R from the front. Therefore, a simple structure using one airbag 42 allows the airbag 42 to protect the driver R from the front and the rear.

Furthermore, at least part of each inner bending portion 52 overlaps the upwardly deploying portion 45 in the vehicle front-rear direction.

This configuration allows the inner bending portion 52 and the upwardly deploying portion 45 to sandwich the driver R in the vehicle front-rear direction, and allows the airbag 42 to be properly in close contact with the driver R to protect the driver R.

Furthermore, each forwardly extending portion 51 extends to be progressively located outward in the vehicle width direction as the forwardly extending portion 51 extends forward.

This configuration allows the forwardly extending portion 51 to be properly deployed forward along the driver R.

Additionally, each second deploying portion 50 includes the downwardly extending portion 53 that bends from the inner bending portion 52 and extends downward.

This configuration allows the downwardly extending portion 53, which extends downward from the inner bending portion 52, to protect the driver R over a large area in the up-down direction.

Furthermore, each forwardly extending portion 51 extends diagonally forward and upward in a vehicle side view.

This configuration allows the downwardly extending portion 53 to extend downward from a high position, allowing the driver R to be protected over a large area in the up-down direction. For example, even if the airbag 42 is disposed at a low position, the forwardly extending portion 51 extends diagonally forward and upward, allowing the driver R to be protected over a large area in the up-down direction. Therefore, the degree of freedom in disposing the airbag 42 can be improved. Furthermore, since the forwardly extending portion 51 extends diagonally, the forwardly extending portion 51 covers the driver R in a larger area, allowing the driver R to be properly protected.

Furthermore, each second deploying portion 50 includes a folded-back portion 54 that is folded back from the downwardly extending portion 53 toward the forwardly extending portion 51.

This configuration allows the folded-back portion 54 to protect the driver R. Furthermore, the folded-back portion 54 is in contact with the forwardly extending portion 51, allowing the second deploying portion 50 to be easily maintained in an appropriate shape.

Furthermore, the upwardly deploying portion 45 is deployed upward along the rear surface of the torso R1 of the driver R sitting on the seat 17; and each second deploying portion 50 extends forward through below the arm R3 of the driver R, sitting on the seat 17 and grasping the handle 21 for steering, and the outer lateral side of the torso R1, and covers the torso R1 from the front.

This configuration allows the second deploying portion 50 to extend to the front side of the torso R1 through below the arm R3 and the outer lateral side of the torso R1. The upwardly deploying portion 45 can protect the torso R1 from the rear, and the second deploying portion 50 can protect the torso R1 from the front and the outer lateral side. The second deploying portion 50 has a size that allows it to pass below the arm R3 and the outer lateral side of the torso R1, allowing the second deploying portion 50 to be compact.

Furthermore, an inflator 41 that jets gas into the airbag 42 to deploy the airbag 42 is connected to the airbag 42, and a separating mechanism 43 is provided that separates the airbag 42 from the inflator 41 after the airbag 42 is deployed.

This configuration causes the airbag 42 to be separated from the inflator 41 after the airbag 42 is deployed, preventing the airbag 42 from being shifted downward by the inflator 41 after the airbag 42 is deployed. Therefore, the airbag 42 can be properly in close contact with the driver R.

Note that the above embodiment shows an aspect to which the present invention is applied, and the present invention is not limited to the above embodiment.

In the above embodiment, the airbag 42 has been described as being provided in a rear part of the seat 17, but the present invention is not limited thereto. The airbag 42 just needs to be disposed behind the seating position 17a, and may be disposed behind the seat for a rider, for example, at an inner side of the vehicle body cover.

Furthermore, the second deploying portions 50 have been described as being provided in a pair of left and right, but there may be a second deploying portion 50 that is provided on either of the left and right.

Additionally, in the embodiment described above, a motorcycle has been described as an example of the saddled vehicle 10, but the present invention is not limited to this, and the present invention is applicable to a three-wheel saddled vehicle having two front wheels or two rear wheels and a saddled vehicle having four or more wheels.

Second Embodiment

A second embodiment to which the present invention is applied will be described below with reference to FIG. 6. In the second embodiment, the same reference signs are given to the portions configured similarly to the portions in the above embodiment (first embodiment), and the description of the portions will be omitted.

The second embodiment differs from the above embodiments in that second deploying portions 250 extend directly toward the front from an upwardly deploying portion 245.

Figure 6:
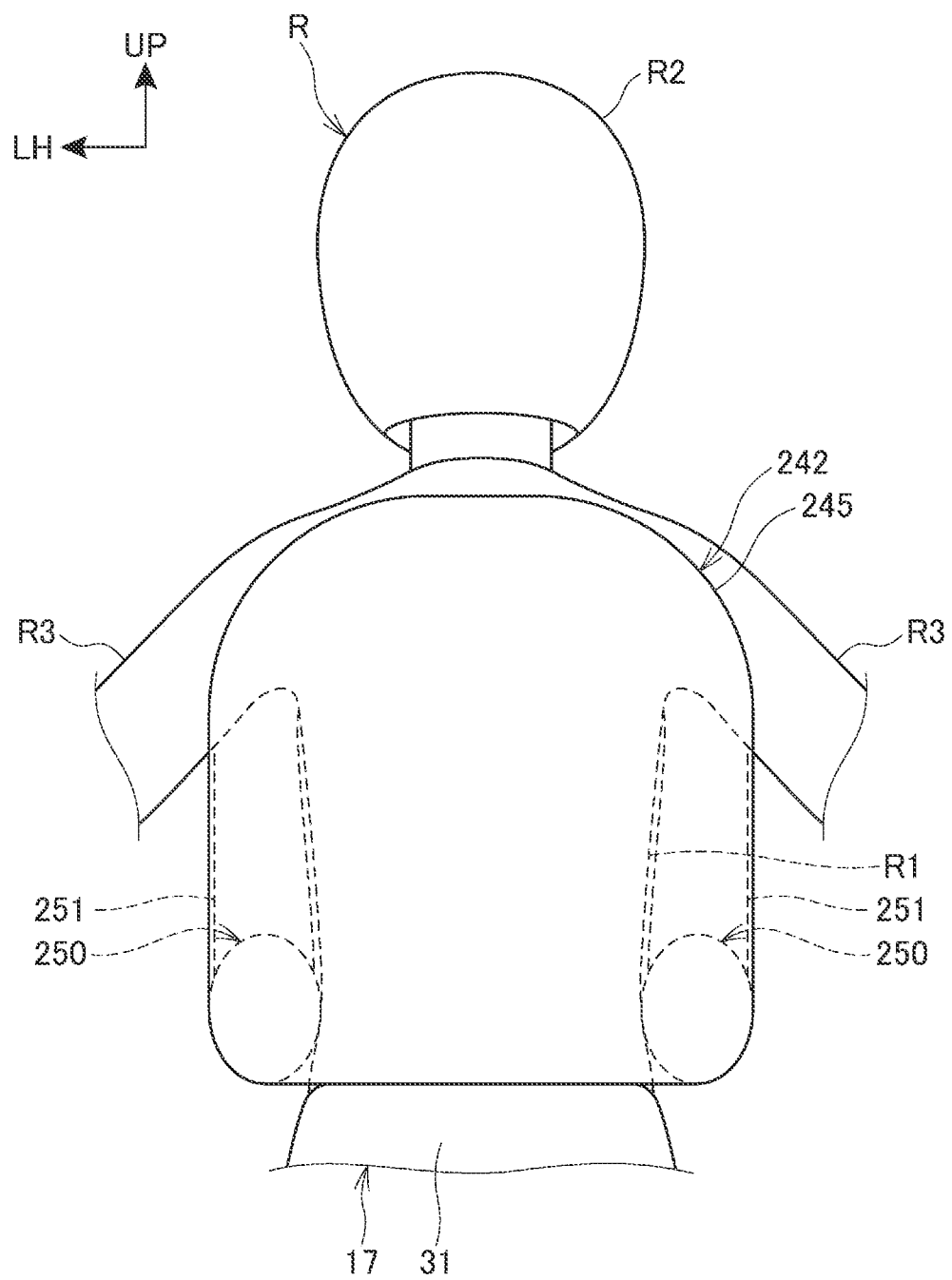
FIG. 6 is a rear view of a state, seen from the rear side, in which an airbag is deployed to protect a driver in a second embodiment.

FIG. 6 is a rear view of a state, seen from the rear side, in which an airbag 242 is deployed to protect a driver R in the second embodiment.

The airbag 242 is stored in the airbag storage portion 33 (FIG. 2). The airbag 242 is connected to the inflator 41 via separating mechanism 43 (FIG. 2).

The airbag 242 includes an upwardly deploying portion 245, a pair of left and right second deploying portions 250 that branch from a portion of the upwardly deploying portion 245 and extend forward when deployed, and inflator connecting portions 46 (FIG. 5).

The upwardly deploying portion 245 has a larger width in the vehicle width direction than the upwardly deploying portion 45 of the above embodiment, and has the same basic shape as the upwardly deploying portion 45 other than the width. The inflator connecting portions 46 are provided at the lower end portion of the upwardly deploying portion 245.

The width of the upwardly deploying portion 245 in the vehicle width direction is larger than the width of the torso R1. Therefore, in a deployed state, each end portion of the upwardly deploying portion 245 in the vehicle width direction is located on the outer side in the vehicle width direction relative to the torso R1.

Each second deploying portion 250 is rod-shaped and extends forward in the vehicle from the front surface of the upwardly deploying portion 245. The second deploying portion 250 has a rod shape that is thinner than the upwardly deploying portion 245.

Specifically, each second deploying portion 250 includes a second forwardly extending portion 251 that extends forward from the outer end portion in the vehicle width direction on the front surface of the lower end portion of the upwardly deploying portion 245, an inner bending portion 52 that bends inward in the vehicle width direction from the front end portion of the second forwardly extending portion 251, a downwardly extending portion 53, and a folded-back portion 54.

The inner bending portion 52, the downwardly extending portion 53, and the folded-back portion 54 of the second deploying portion 250 have the same shapes as the inner bending portion 52, the downwardly extending portion 53, and the folded-back portion 54 in FIG. 3, and these will be described with reference to FIG. 3.

Each second forwardly extending portion 251 has a rod shape that extends forward from the upwardly deploying portion 245 almost directly toward the front. The second forwardly extending portion 251 extends diagonally forward and upward, and extends upward toward the front in the same way as the forwardly extending portion body 51b in FIG. 2 in a vehicle side view.

The second forwardly extending portion 251 extends forward and upward from the upwardly deploying portion 245 through the outer lateral side of the torso R1, and extends to the front of the torso R1 through between the arm R3 and the torso R1. The second forwardly extending portion 251 protects the torso R1 from the outer lateral side.

The inner bending portion 52 of the second deploying portion 250 extends inward in the vehicle width direction from the front end portion of the second forwardly extending portion 251 that extends upward toward the front.

The folded-back portion 54 of the second deploying portion 250 is in contact with the second forwardly extending portion 251 from the front.

In the airbag 242, the upwardly deploying portion 245 that protects the torso R1 from the rear is connected with the inner bending portions 52 that protect the torso R1 from the front, respectively by the second forwardly extending portions 251. Therefore, one airbag 242 can protect the torso R1 from the rear and the front.

As described above, according to the second embodiment to which the present invention is applied, the airbag 242 includes the upwardly deploying portion 245 that is deployed upward when deployed, the second deploying portions 250 that branch and extend from the lower end portion that is a portion of the upwardly deploying portion 245; and each second deploying portion 250 includes the second forwardly extending portion 251 that extends forward from the upwardly deploying portion 245, and the inner bending portion 52 that bends inward in the vehicle width direction from the second forwardly extending portion 251.

This configuration allows the upwardly deploying portion 245 to protect the driver R from the rear, and allows the inner bending portions 52, each of which bends inward in the vehicle width direction from the second forwardly extending portion 251 extending forward from the upwardly deploying portion 245, to protect the driver R from the front. Therefore, a simple structure using one airbag 242 allows the airbag 242 to protect the driver R from the front and the rear.

Figure 7:
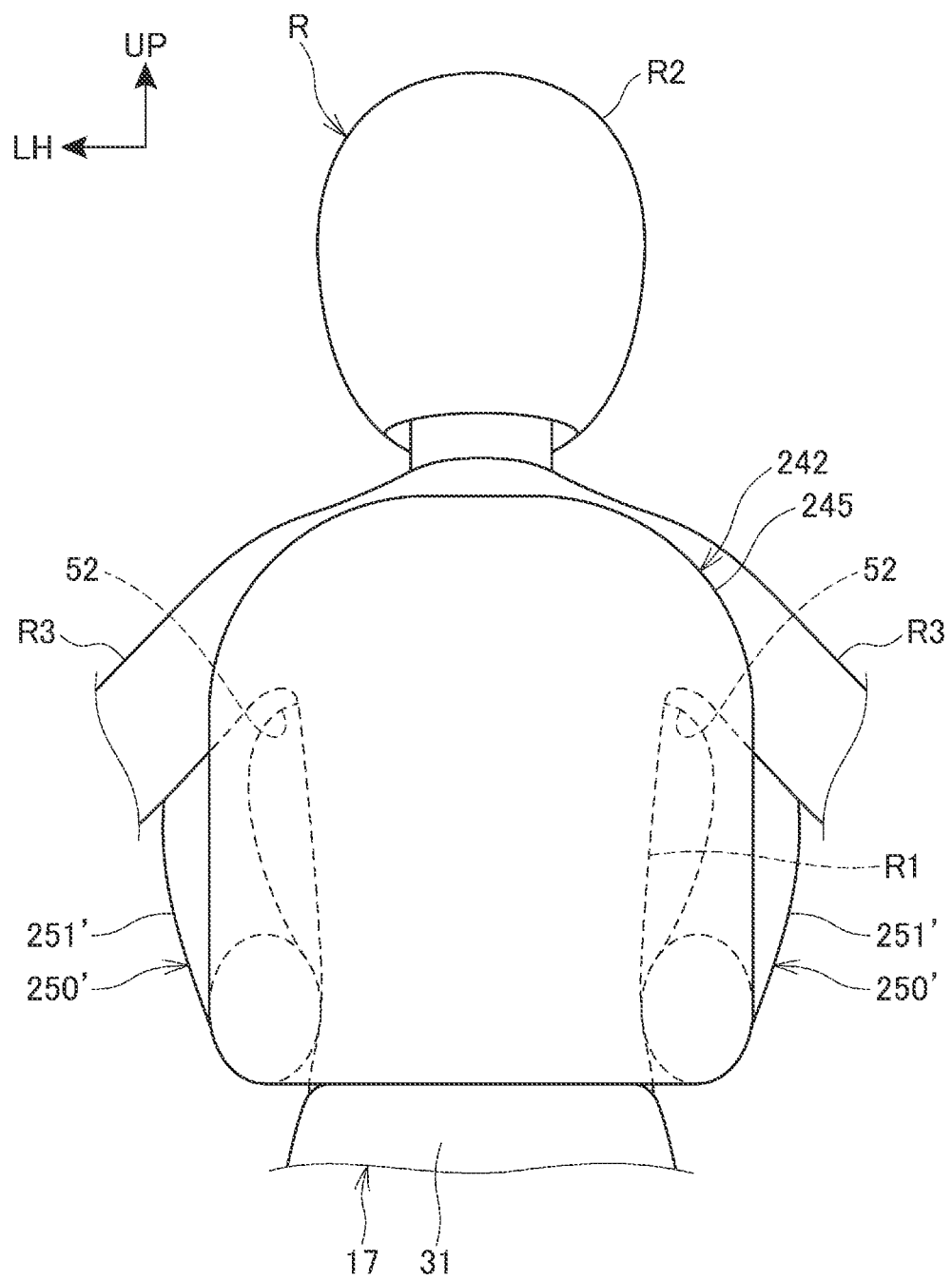
FIG. 7 is a rear view of a state, seen from the rear side, in which an airbag is deployed to protect a driver in a modification of the second embodiment.

FIG. 7 is a rear view of a state, seen from the rear side, in which an airbag 242 is deployed to protect a driver R in a modification of the second embodiment. In this modification, the same reference signs are given to the portions configured similarly to the portions in the second embodiment, and the description of the portions will be omitted.

In the above second embodiment, each second deploying portion 250 extends forward from the front surface of the upwardly deploying portion 245, but the second deploying portion 250 may extend forward and outward from the front surface of the upwardly deploying portion 245.

In this modification, the second deploying portions 250 are referred to as second deploying portions 250' for distinction.

Second forwardly extending portions 251' of the second deploying portions 250' each extend forward and outward from the front surface of the upwardly deploying portion 245. Each second forwardly extending portion 251' inclines to be progressively located outward in the vehicle width direction as the second forwardly extending portion 251' extends rearward, from the upwardly deploying portion 245 to the inner bending portion 52.

The second forwardly extending portion 251' extends diagonally forward and upward, and extends upward toward the front in a vehicle side view like the forwardly extending portion body 51b in FIG. 2.

The second forwardly extending portion 251' extends forward and upward from the upwardly deploying portion 245 through the outer lateral side of the torso R1, and extends to the front of the torso R1 through between the arm R3 and the torso R1.

The inner bending portion 52 of the second deploying portion 250' extends inward in the vehicle width direction from the front end portion of the second forwardly extending portion 251' that extends upward toward the front. The folded-back portion 54 (see FIG. 3) of the second deploying portion 250' is folded back toward the second forwardly extending portion 251'.

Third Embodiment

A third embodiment to which the present invention is applied will be described below with reference to FIGS. 8 and 9. In the third embodiment, the same reference signs are given to the portions configured similarly to the portions in the above embodiment (first embodiment), and the description of the portions will be omitted.

The third embodiment differs from the above embodiments in that a second deploying portion 350 having a shape different from that of the second deploying portion 50 is provided.

Figure 8:
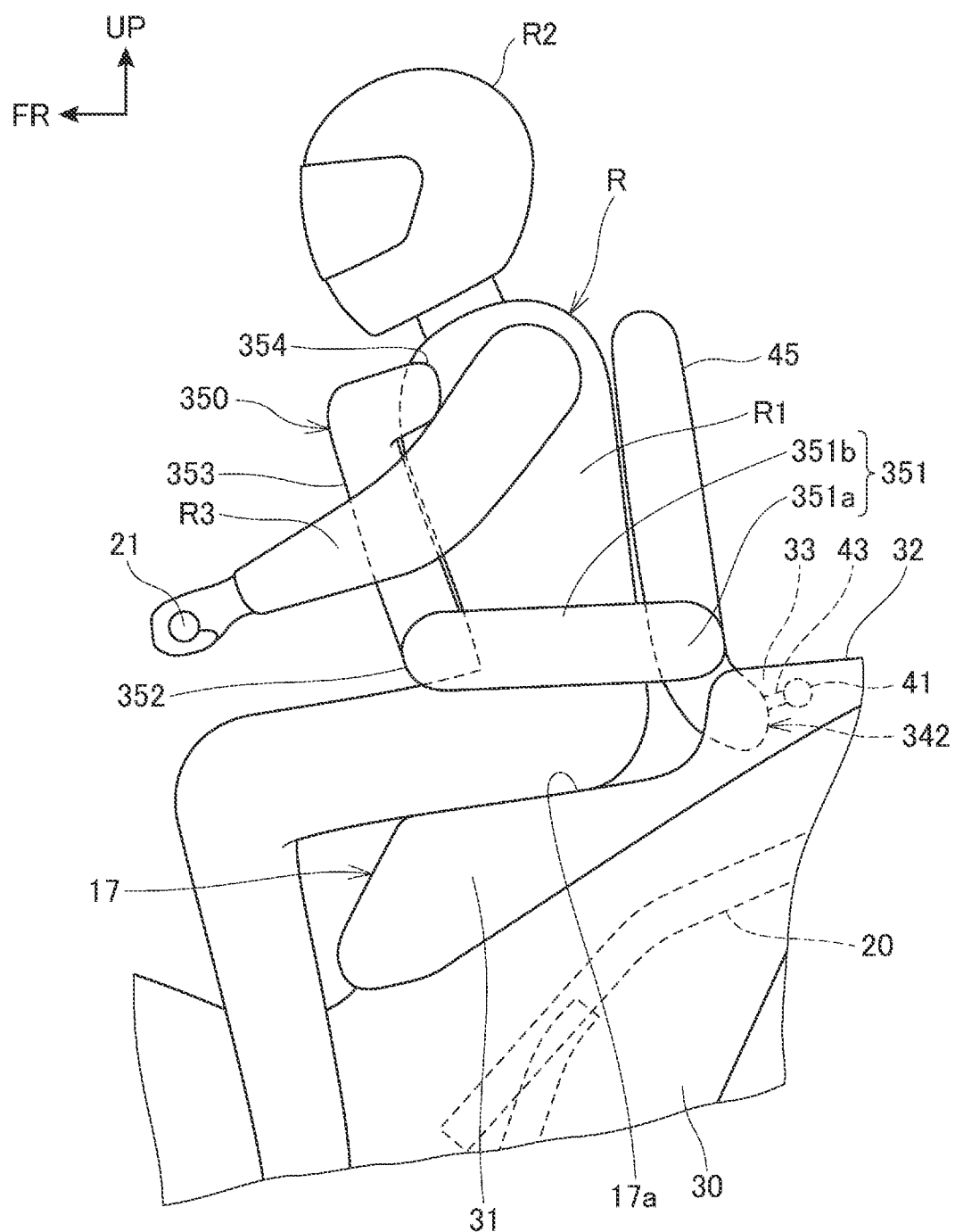
FIG. 8 is a left side view showing a state in which an airbag is deployed to protect a driver in a third embodiment.

FIG. 8 is a left side view showing a state in which an airbag 342 is deployed to protect a driver R in the third embodiment. FIG. 9 is a front view of the state, seen from the front side, in which the airbag 342 is deployed to protect the driver R.

The airbag 342 is stored in the airbag storage portion 33. The airbag 342 is connected to the inflator 41 via separating mechanism 43.

The airbag 342 includes an upwardly deploying portion 45, and a pair of left and right second deploying portions 350 that branch from a portion of the upwardly deploying portion 45 and extend forward when deployed.

Furthermore, the airbag 342 includes inflator connecting portions 46 (FIG. 5) at the lower end portion of the upwardly deploying portion 45.

The second deploying portions 350 have rod shapes that extend forward respectively from the lateral side portions located on the outer sides in the vehicle width direction of the upwardly deploying portion 45. Each second deploying portion 350 has a rod shape that is thinner than the upwardly deploying portion 45.

The second deploying portion 350 extends from the lateral side portion in the lower part of the upwardly deploying portion 45. The proximal end portion of the second deploying portion 350 communicates with the inside of the upwardly deploying portion 45.

The left and right second deploying portions 350 are provided symmetrically with respect to the center in the vehicle width direction of the upwardly deploying portion 45.

Specifically, each second deploying portion 350 includes a forwardly extending portion 351 that extends outward in the vehicle width direction from the lower end portion of the upwardly deploying portion 45 and then extends forward, and an inner bending portion 352 that bends inward in the vehicle width direction from the forwardly extending portion 351 and extends inward in the vehicle width direction.

Additionally, the second deploying portion 350 includes an upwardly extending portion 353 that bends from the inner bending portion 352 and extends upward, a rearwardly folded-back portion 354 that is folded back rearward from the upwardly extending portion 353.

Each forwardly extending portion 351 includes a laterally extending portion 351a extending outward in the vehicle width direction from the lower end portion of the upwardly deploying portion 45, and a forwardly extending portion body 351b extending forward from the laterally extending portion 351a. The laterally extending portion 351a extends outward in the vehicle width direction relative to the torso R1.

The laterally extending portion 351a is the proximal end portion of the second deploying portion 350. Part of the gas, which has flowed from the inflator connecting portions 46 into the upwardly deploying portion 45, flows from the laterally extending portion 351a into the second deploying portion 350.

Each forwardly extending portion body 351b has a rod shape that extends substantially horizontally forward from the laterally extending portion 351a in a vehicle side view.

The forwardly extending portion body 351b extends from the laterally extending portion 351a to the front of the torso R1 through below the arm R3 and the outer lateral side of the torso R1.

The forwardly extending portion body 351b extends to be progressively located outward in the vehicle width direction as the forwardly extending portion body 351b extends forward from the laterally extending portion 351a.

Each inner bending portion 352 extends inward in the vehicle width direction from the front end portion of the forwardly extending portion body 351b. The inner bending portion 352 is located below the handle 21. The inner bending portion 352 turns to the front surface side of the torso R1 and is in contact with the front surface of the torso R1.

The upwardly extending portion 353 extends upward from the inner end portion 352a in the vehicle width direction of the inner bending portion 352. The upwardly extending portion 353 extends upward along the front surface of the torso R1. The upwardly extending portion 353 extends above the handle 21.

Each rearwardly folded-back portion 354 is folded back rearward and outward in the vehicle width direction from the upper end portion of the upwardly extending portion 353. The rearwardly folded-back portion 354 is in contact with at least one of the upper part of the torso R1 and the upper part of the arm R3 from the front.

With the airbag 342 deployed, the airbag 342 surrounds the driver R and is in close contact with the driver R.

Specifically, the upwardly deploying portion 45 covers the torso R1 from the rear and protects the torso R1 from the rear.

The left and right forwardly extending portions 351 cover the torso R1 from the outer lateral sides below the arms R3 and protect the torso R1 from the outer lateral sides.

Each inner bending portion 352 covers the lower part of the front surface of the torso R1 from the front and protects the lower part of the front surface of the torso R1 from the front.

Each upwardly extending portion 353 covers the front surface of the torso R1 from the front and protects the torso R1 from the front.

Each rearwardly folded-back portion 354 covers at least one of the upper part of the torso R1 and the upper part of the arm R3, and protects the torso R1 and the arm R3 from the front. Furthermore, the rearwardly folded-back portion 354 is in contact with at least one of the torso R1 and the arm R3 from the front, to suppress deformation of the overall shape of the second deploying portion 350 and maintain the second deploying portion 350 in an appropriate shape.

In the airbag 342, the upwardly deploying portion 45 that protects the torso R1 from the rear is connected with the inner bending portions 352 that protect the torso R1 from the front, respectively by the forwardly extending portions 351. Therefore, one airbag 342 can protect the torso R1 from the rear and the front.

The airbag 342 has the forwardly extending portions 351 respectively passing below the arms R3 and the outer lateral sides of the torso R1, so that the airbag 342 can prevent the arms R3 and the torso R1 from getting in the way of deployment of the forwardly extending portions 351, and is properly in close contact with the driver via the left and right forwardly extending portions 351.

The airbag 342 sandwiches the driver R in the vehicle front-rear direction between: the inner bending portions 352 and the upwardly extending portions 353; and the upwardly deploying portion 45. Therefore, the airbag 342 is properly in close contact with the driver R.

Figure 9:
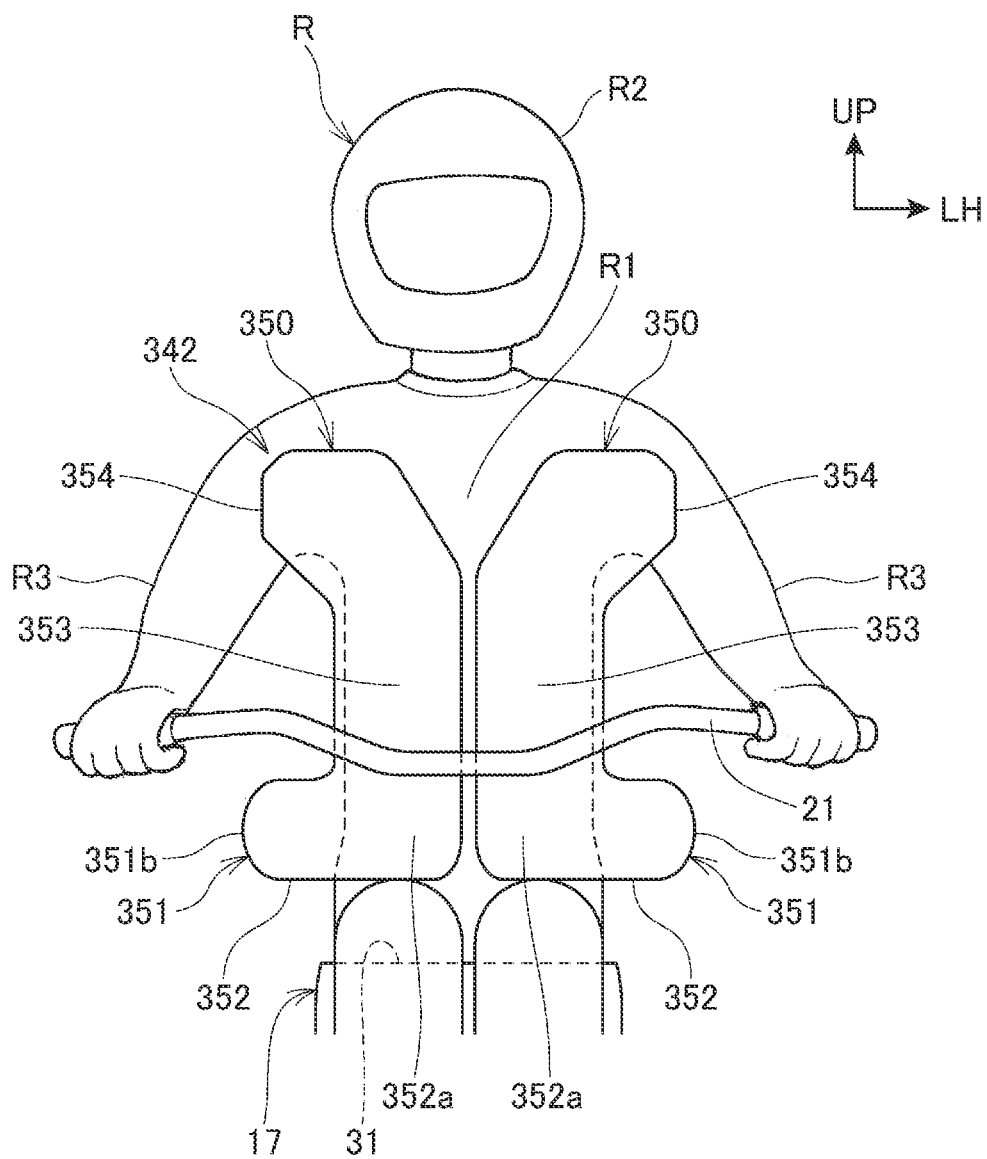
FIG. 9 is a front view of the state, seen from the front side, in which the airbag is deployed to protect the driver.

With reference to FIGS. 8 and 9, in a state in which the airbag 342 is deployed to the driver R, at least part of each inner bending portion 352 overlaps the upwardly deploying portion 45 in the vehicle front-rear direction. Furthermore, in a state in which the airbag 42 is deployed to the driver R, at least part of each upwardly extending portion 353 overlaps the upwardly deploying portion 45 in the vehicle front-rear direction.

In other words, in the front view shown in FIG. 9, the inner bending portions 352 and the upwardly extending portions 353 overlap the upwardly deploying portion 45 from the front. Therefore, the inner bending portions 352 and the upwardly extending portions 353, and the upwardly deploying portion 45 can sandwich the driver R between the front and the rear, allowing the airbag 342 to be effectively in close contact with the driver R.

Each second deploying portion 350 is rod-shaped and has a small volume, resulting in quick deployment.

As described above, according to the third embodiment to which the present invention is applied, the airbag 342 includes the upwardly deploying portion 45 that is deployed upward when deployed, and the second deploying portions 350 that branch and extend from the lower end portion that is a portion of the upwardly deploying portion 45; each second deploying portion 350 includes the forwardly extending portion 351 that extends outward in the vehicle width direction from the upwardly deploying portion 45 and then extends forward, and the inner bending portion 352 that bends inward in the vehicle width direction from the forwardly extending portion 351.

This configuration allows the upwardly deploying portion 45 to protect the driver R from the rear, and allows the inner bending portion 352, which bends inward in the vehicle width direction from the forwardly extending portion 351 in front of the upwardly deploying portion 45, to protect the driver R from the front. Therefore, the airbag 342 can protect the driver R from the front and rear with a simple structure.

Furthermore, each second deploying portion 350 includes an upwardly extending portion 353 that bends from the inner bending portion 352 and extends upward.

This configuration allows the upwardly extending portion 353 extending upward from the inner bending portion 352 to protect the driver R over a large area in the up-down direction.

In the above third embodiment, each second deploying portion 350 includes the forwardly extending portion 351. However, instead of the forwardly extending portion 351, the second deploying portion 350 may include a second forwardly extending portion extending forward from the upwardly deploying portion 245 as shown in FIG. 6, or a second forwardly extending portion extending forward and outward from the upwardly deploying portion 245 as shown in FIG. 7. In this case, in a vehicle side view, the second forwardly extending portion extends substantially horizontally forward, and the inner bending portion 352 extends inward in the vehicle width direction from the front end portion of the second forwardly extending portion, as shown in FIG. 8.

Fourth Embodiment

A fourth embodiment to which the present invention is applied will be described below with reference to FIGS. 10 and 11. In the fourth embodiment, the same reference signs are given to the portions configured similarly to the portions in the above embodiment (first embodiment), and the description of the portions will be omitted.

The fourth embodiment differs from the above embodiments in that a second deploying portion 450 having a shape different from that of the second deploying portion 50 is provided.

Figure 10:
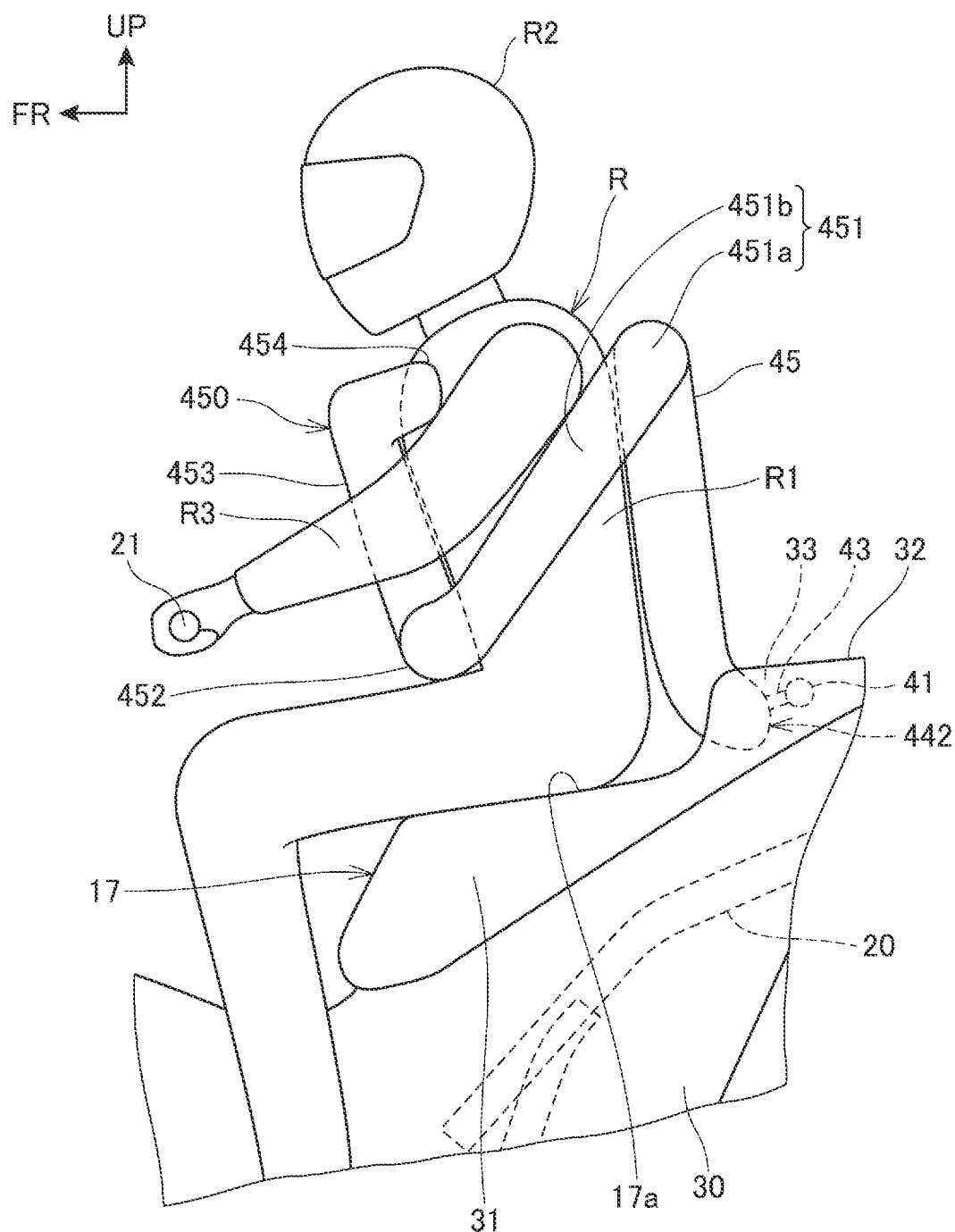
FIG. 10 is a left side view showing a state in which an airbag is deployed to protect a driver in a fourth embodiment.
Figure 11:
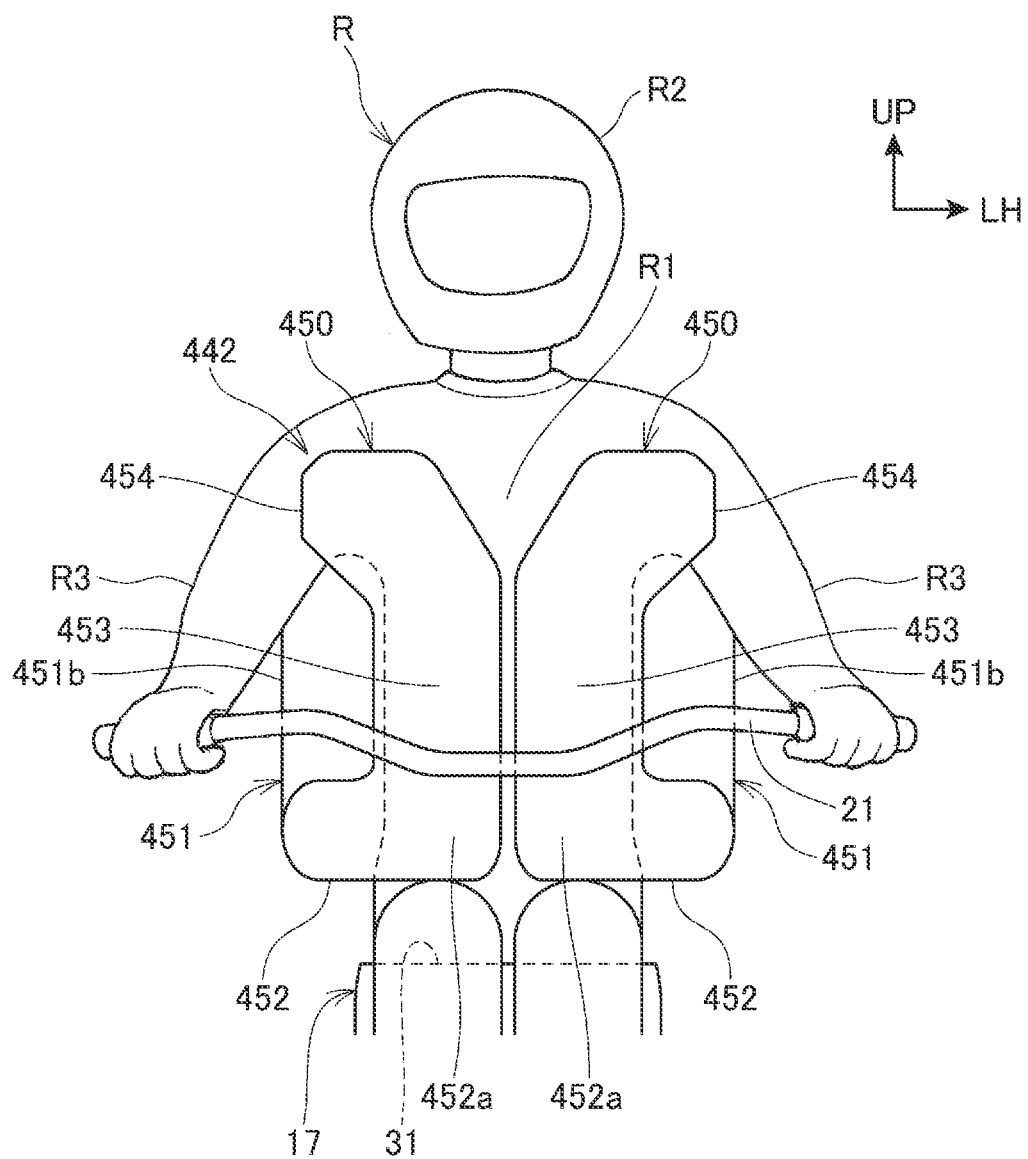
FIG. 11 is a front view of the state, seen from the front side, in which the airbag is deployed to protect the driver.

FIG. 10 is a left side view showing a state in which an airbag 442 is deployed to protect the driver R in the fourth embodiment. FIG. 11 is a front view of a state, seen from the front side, in which the airbag 442 is deployed to protect a driver R.

The airbag 442 is stored in the airbag storage portion 33. The airbag 442 is connected to the inflator 41 via separating mechanism 43.

The airbag 442 includes an upwardly deploying portion 45, and a pair of left and right second deploying portions 450 that branch from a portion of the upwardly deploying portion 45 and extend forward when deployed.

Furthermore, the airbag 442 includes inflator connecting portions 46 (FIG. 5) at the lower end portion of the upwardly deploying portion 45.

The second deploying portions 450 have rod shapes that extend forward respectively from the lateral side portions located on the outer sides in the vehicle width direction of the upwardly deploying portion 45. Each second deploying portion 450 has a rod shape that is thinner than the upwardly deploying portion 45.

The second deploying portion 450 extends from the lateral side portion in the upper part of the upwardly deploying portion 45. The proximal end portion of the second deploying portion 450 communicates with the inside of the upwardly deploying portion 45.

The left and right second deploying portions 450 are provided symmetrically with respect to the center in the vehicle width direction of the upwardly deploying portion 45.

Specifically, each second deploying portion 450 includes a forwardly extending portion 451 that extends outward in the vehicle width direction from the upper end portion of the upwardly deploying portion 45 and then extends forward, and an inner bending portion 452 that bends inward in the vehicle width direction from the forwardly extending portion 451 and extends inward in the vehicle width direction.

Additionally, the second deploying portion 450 includes an upwardly extending portion 453 that bends from the inner bending portion 452 and extends upward, and a second folded-back portion 454 that is folded back rearward from the upwardly extending portion 453.

Each forwardly extending portion 451 includes a laterally extending portion 451a extending outward in the vehicle width direction from the upper end portion of the upwardly deploying portion 45, and a forwardly extending portion body 451*b* extending forward from the laterally extending portion 451*a*. The laterally extending portion 451*a* extends outward in the vehicle width direction relative to the torso R1.

Each laterally extending portion 451*a* is the proximal end portion of the second deploying portion 450. Part of the gas, which has flowed from the inflator connecting portions 46 into the upwardly deploying portion 45, flows from the laterally extending portion 451*a* into the second deploying portion 450.

Each forwardly extending portion body 451*b* has a rod shape that extends diagonally forward and downward from the laterally extending portion 451*a* in a vehicle side view.

The forwardly extending portion body 451*b* extends from the laterally extending portion 451*a* to the front of the torso R1 through below the arm R3 and the outer lateral side of the torso R1. The forwardly extending portion body 451*b* extends downward toward the front along the arm R3 in a vehicle side view.

The forwardly extending portion body 451*b* extends forward from the laterally extending portion 451*a* almost directly toward the front, but may extend to be progressively located outward in the vehicle width direction as the forwardly extending portion body 451*b* extends forward.

Each inner bending portion 452 extends inward in the vehicle width direction from the front end portion of the forwardly extending portion body 451*b*. The inner bending portion 452 is located below the handle 21. The inner bending portion 452 turns to the front surface side of the torso R1 and is in contact with the front surface of the torso R1.

Each upwardly extending portion 453 extends upward from the inner end portion 452*a* in the vehicle width direction of the inner bending portion 452. The upwardly extending portion 453 extends upward along the front surface of the torso R1. The upwardly extending portion 453 extends above the handle 21.

Each second folded-back portion 454 is folded back rearward and outward in the vehicle width direction from the upper end portion of the upwardly extending portion 453. The second folded-back portion 454 extends rearward toward a forwardly extending portion body 451*b* that extends downward toward the front behind the second folded-back portion 454.

With the airbag 442 deployed, the airbag 442 surrounds the driver R and is in close contact with the driver R.

Specifically, the upwardly deploying portion 45 covers the torso R1 from the rear and protects the torso R1 from the rear.

The left and right forwardly extending portions 451 cover the torso R1 from the outer lateral sides below the arms R3 and protect the torso R1 from the outer lateral sides.

Each inner bending portion 452 covers the lower part of the front surface of the torso R1 from the front and protects the lower part of the front surface of the torso R1 from the front.

Each upwardly extending portion 453 covers the front surface of the torso R1 from the front and protects the torso R1 from the front.

Each second folded-back portion 454 covers at least one of the upper part of the torso R1 and the upper part of the arm R3, and protects the torso R1 and the arm R3 from the front. Furthermore, the second folded-back portion 454 is in contact with at least one of the torso R1 and the arm R3 from the front, to suppress deformation of the overall shape of the second deploying portion 450 and maintain the second deploying portion 450 in an appropriate shape.

In the airbag 442, the upwardly deploying portion 45 that protects the torso R1 from the rear is connected with the inner bending portions 452 that protect the torso R1 from the front, respectively by the forwardly extending portions 451. Therefore, one airbag 442 can protect the torso R1 from the rear and the front.

The airbag 442 has the forwardly extending portions 451 respectively passing below the arms R3 and the outer lateral sides of the torso R1, so that the airbag 442 can prevent the arms R3 and the torso R1 from getting in the way of deployment of the forwardly extending portions 451, and is properly in close contact with the driver via the left and right forwardly extending portions 451.

In the front view shown in FIG. 9, the inner bending portions 452 and the upwardly extending portions 453 overlap the upwardly deploying portion 45 (FIG. 10) from the front. Therefore, the inner bending portions 452 and the upwardly extending portions 453, and the upwardly deploying portion 45 can sandwich the driver R between the front and the rear, allowing the airbag 442 to be effectively in close contact with the driver R.

As described above, according to the fourth embodiment to which the present invention is applied, the airbag 442 includes the upwardly deploying portion 45 that is deployed upward when deployed, and the second deploying portions 450 that branch and extend from the upper end portion that is a portion of the upwardly deploying portion 45; and each second deploying portion 450 includes the forwardly extending portion 451 that extends outward in the vehicle width direction from the upwardly deploying portion 45 and then extends forward, and the inner bending portion 452 that bends inward in the vehicle width direction from the forwardly extending portion 451.

This configuration allows the upwardly deploying portion 45 to protect the driver R from the rear, and allows the inner bending portion 452 that bends inward in the vehicle width direction from the forwardly extending portion 451 in front of the upwardly deploying portion 45, to protect the driver R from the front. Therefore, the airbag 442 can protect the driver R from the front and rear with a simple structure.

Furthermore, each second deploying portion 450 includes an upwardly extending portion 453 that bends from the inner bending portion 452 and extends upward.

This configuration allows the upwardly extending portion 453 extending upward from the inner bending portion 452 to protect the driver R over a large area in the up-down direction.

Furthermore, each forwardly extending portion 451 extends diagonally forward and downward in a vehicle side view.

This configuration allows the upwardly extending portion 453 to extend upward from a low position, allowing the driver R to be protected over a large area in the up-down direction. Furthermore, since the forwardly extending portion 451 extends diagonally, the forwardly extending portion 451 covers the driver in a larger area, allowing the driver R to be properly protected.

Furthermore, each second deploying portion 450 includes the second folded-back portion 454 that is folded back from the upwardly extending portion 453 toward the forwardly extending portion 451.

This configuration allows the second folded-back portion 454 to protect the driver R. Furthermore, the second folded-back portion 454 is in contact with the driver R, allowing the second deploying portion 450 to be easily maintained in an appropriate shape. Note that the second folded-back portion 454 may be in contact with the forwardly extending portion 451 from the front, to maintain the shape of the second deploying portion 450.

In the above fourth embodiment, each second deploying portion 450 includes the forwardly extending portion 451. However, instead of the forwardly extending portion 451, the second deploying portion 450 may include a second forwardly extending portion extending forward from the upwardly deploying portion 245 as shown in FIG. 6, or a second forwardly extending portion extending forward and outward from the upwardly deploying portion 245 as shown in FIG. 7. In this case, in a vehicle side view, the second forwardly extending portion extends downward toward the front, and the inner bending portion 452 extends inward in the vehicle width direction from the front end portion of the second forwardly extending portion, as shown in FIG. 10. Furthermore, the second folded-back portion 454 may be folded back toward the second forwardly extending portion.

Fifth Embodiment

A fifth embodiment to which the present invention is applied will be described below with reference to FIGS. 12 and 13. In the fifth embodiment, the same reference signs are given to the portions configured similarly to the portions in the above embodiment (first embodiment), and the description of the portions will be omitted.

The fifth embodiment differs from the above embodiments in that a second deploying portion 550 having a shape different from that of the second deploying portion 50 is provided.

Figure 12:
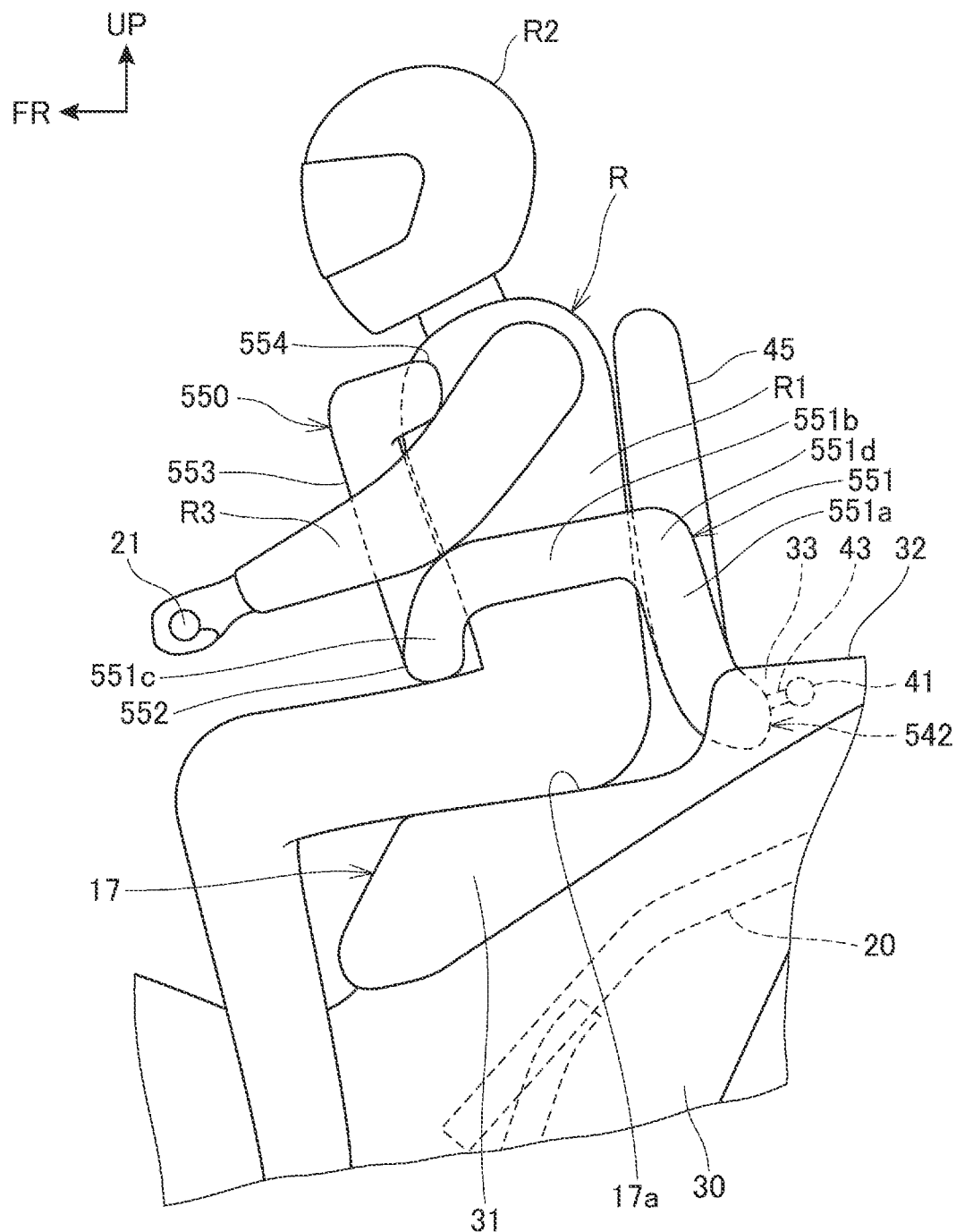
FIG. 12 is a left side view showing a state in which an airbag is deployed to protect a driver in a fifth embodiment.

FIG. 12 is a left side view showing a state in which an airbag 542 is deployed to protect the driver R in the fifth embodiment. FIG. 13 is a front view of a state, seen from the front side, in which the airbag 542 is deployed to protect the driver R.

The airbag 542 is stored in the airbag storage portion 33. The airbag 542 is connected to the inflator 41 via separating mechanism 43.

The airbag 542 includes an upwardly deploying portion 45, and a pair of left and right second deploying portions 550 that branch from a portion of the upwardly deploying portion 45 and extend forward when deployed.

Furthermore, the airbag 542 includes inflator connecting portions 46 (FIG. 5) at the lower end portion of the upwardly deploying portion 45.

The second deploying portions 550 have rod shapes that extend forward respectively from the lateral side portions located on the outer sides in the vehicle width direction of the upwardly deploying portion 45. Each second deploying portion 550 has a rod shape that is thinner than the upwardly deploying portion 45.

The second deploying portion 550 extends from the lateral side portion in the lower part of the upwardly deploying portion 45. The proximal end portion of the second deploying portion 550 communicates with the inside of the upwardly deploying portion 45.

The left and right second deploying portions 550 are provided symmetrically with respect to the center in the vehicle width direction of the upwardly deploying portion 45.

Specifically, each second deploying portion 550 includes a forwardly extending portion 551 that extends outward in the vehicle width direction and upward from the lower end portion of the upwardly deploying portion 45 and then extends forward, and an inner bending portion 552 that bends inward in the vehicle width direction from the forwardly extending portion 551 and extends inward in the vehicle width direction.

Additionally, the second deploying portion 550 includes an upwardly extending portion 553 that bends from the inner bending portion 552 and extends upward, and a rearwardly folded-back portion 554 that is folded rearward from the upwardly extending portion 553.

Each forwardly extending portion 551 includes an outwardly-upwardly extending portion 551a extending outward in the vehicle width direction and upward from the lower end portion of the upwardly deploying portion 45, an intermediate extending portion 551b extending forward from an upper end portion 551d of the outwardly-upwardly extending portion 551a, and a forwardly-downwardly extending portion 551c extending forward and downward from the front end portion of the intermediate extending portion 551b.

Each outwardly-upwardly extending portion 551a extends outward in the vehicle width direction relative to the torso R1. Furthermore, the upper end portion 551d of the outwardly-upwardly extending portion 551a is located at a position with the same height as the middle part in the up-down direction of the upwardly deploying portion 45. In a vehicle side view, the substantially entire outwardly-upwardly extending portion 551a positionally coincides with the upwardly deploying portion 45 from the outer side in the vehicle width direction. The outwardly-upwardly extending portion 551a is proximal end portion of the second deploying portion 550. Part of the gas, which has flowed from the inflator connecting portions 46 into the upwardly deploying portion 45, flows from the outwardly-upwardly extending portion 551a into the second deploying portion 550.

Each intermediate extending portion 551b bends at the upper end portion 551d located at a position with a height of middle part in the up-down direction of the upwardly deploying portion 45, and extends forward. The intermediate extending portion 551b extends from the upper end portion 551d to the vicinity of the front surface of the torso R1 through below the arm R3 and the outer lateral side of the torso R1. The intermediate extending portion 551b extends slightly downward toward the front in a vehicle side view. The intermediate extending portion 551b extends forward from the upper end portion 551d almost directly toward the front, but may extend to be progressively located outward in the vehicle width direction as the intermediate extending portion 551b extends forward.

Each forwardly-downwardly extending portion 551c extends forward and downward from the front end portion of the intermediate extending portion 551b to the front of the torso R1.

Each inner bending portion 552 extends inward in the vehicle width direction from the front end portion of the forwardly-downwardly extending portion 551c. The inner bending portion 552 is located below the handle 21. The inner bending portion 552 turns to the front surface side of the torso R1 and is in contact with the front surface of the torso R1.

Each upwardly extending portion 553 extends upward from the inner end portion 552a in the vehicle width direction of the inner bending portion 552. The upwardly extending portion 553 extends upward along the front surface of the torso R1. The upwardly extending portion 553 extends above the handle 21.

Each rearwardly folded-back portion 554 is folded back rearward and outward in the vehicle width direction from the upper end portion of the upwardly extending portion 553.

With the airbag 542 deployed, the airbag 542 surrounds the driver R and is in close contact with the driver R.

Specifically, the upwardly deploying portion 45 covers the torso R1 from the rear and protects the torso R1 from the rear.

The left and right forwardly extending portions 551 cover the torso R1 from the outer lateral sides below the arms R3 and protect the torso R1 from the outer lateral sides.

Each inner bending portion 552 covers the lower part of the front surface of the torso R1 from the front and protects the lower part of the front surface of the torso R1 from the front.

Each upwardly extending portion 553 covers the front surface of the torso R1 from the front and protects the torso R1 from the front.

Each rearwardly folded-back portion 554 covers at least one of the upper part of the torso R1 and the upper part of the arm R3, and protects the torso R1 and the arm R3 from the front. Furthermore, the rearwardly folded-back portion 554 is in contact with at least one of the torso R1 and the arm R3 from the front, to suppress deformation of the overall shape of the second deploying portion 550 and maintain the second deploying portion 550 in an appropriate shape.

In the airbag 542, the upwardly deploying portion 45 that protects the torso R1 from the rear is connected with the inner bending portions 552 that protect the torso R1 from the front, respectively by the forwardly extending portions 551. Therefore, one airbag 542 can protect the torso R1 from the rear and the front.

The airbag 542 has the forwardly extending portions 551 respectively passing below the arms R3 and the outer lateral sides of the torso R1, so that the airbag 542 can prevent the arms R3 and the torso R1 from getting in the way of deployment of the forwardly extending portions 551, and is properly in close contact with the driver via the left and right forwardly extending portions 551.

Figure 13:
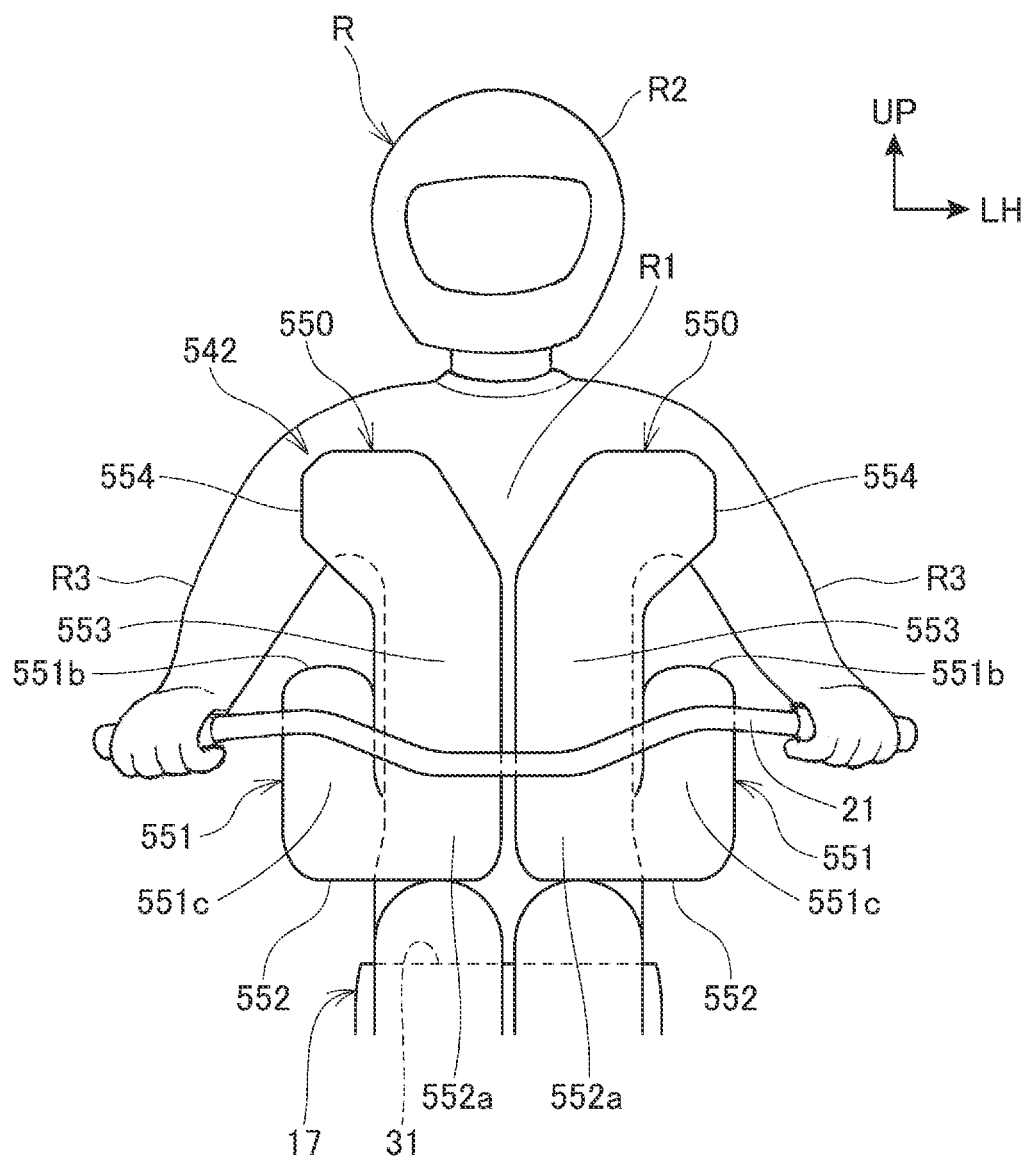
FIG. 13 is a front view of the state, seen from the front side, in which the airbag is deployed to protect the driver.

In the front view shown in FIG. 13, the inner bending portions 552 and the upwardly extending portions 553 overlap the upwardly deploying portion 45 (FIG. 12) from the front. Therefore, the inner bending portions 552 and the upwardly extending portions 553, and the upwardly deploying portion 45 can sandwich the driver R between the front and the rear, allowing the airbag 542 to be effectively in close contact with the driver R.

As described above, according to the fifth embodiment to which the present invention is applied, the airbag 542 includes the upwardly deploying portion 45 that is deployed upward when deployed, and the second deploying portions 550 that branch and extend from a portion of the upwardly deploying portion 45; and each second deploying portion 550 includes the forwardly extending portion 551 that extends outward in the vehicle width direction from the upwardly deploying portion 45 and then extends forward, and the inner bending portion 552 that bends inward in the vehicle width direction from the forwardly extending portion 551.

This configuration allows the upwardly deploying portion 45 to protect the driver R from the rear, and allows the inner bending portion 552 that bends inward in the vehicle width direction from the forwardly extending portion 551 in front of the upwardly deploying portion 45, to protect the driver R from the front. Therefore, the airbag 542 can protect the driver R from the front and rear with a simple structure.

Furthermore, each forwardly extending portion 551 extends outward in the vehicle width direction and upward from the lower part of the upwardly deploying portion 45, and bends and extends forward from a position with a height of the middle part in the up-down direction of the upwardly deploying portion 45 in a vehicle side view.

This configuration has the forwardly extending portions 551 each bending and extending forward from a position with a height of the middle part in the up-down direction of the upwardly deploying portion 45 in a vehicle side view, so that the driver R is not likely to get in the way of the deployment of the forwardly extending portions 551, and each forwardly extending portion 551 is allowed to pass through a position that is not too low to allow the second deploying portion 550 to properly protect the driver R. If the forwardly extending portion 551 is too low, the second deploying portion 550 is far from the torso R1. If the forwardly extending portion 551 is too high, the forwardly extending portion 551 is likely to hit the arm R3.

Sixth Embodiment

A sixth embodiment to which the present invention is applied will be described below with reference to FIGS. 14 and 15. In the sixth embodiment, the same reference signs are given to the portions configured similarly to the portions in the above embodiment (first embodiment), and the description of the portions will be omitted.

The sixth embodiment differs from the above embodiments in that a second deploying portion 650 having a shape different from that of the second deploying portion 50 is provided.

Figure 14:
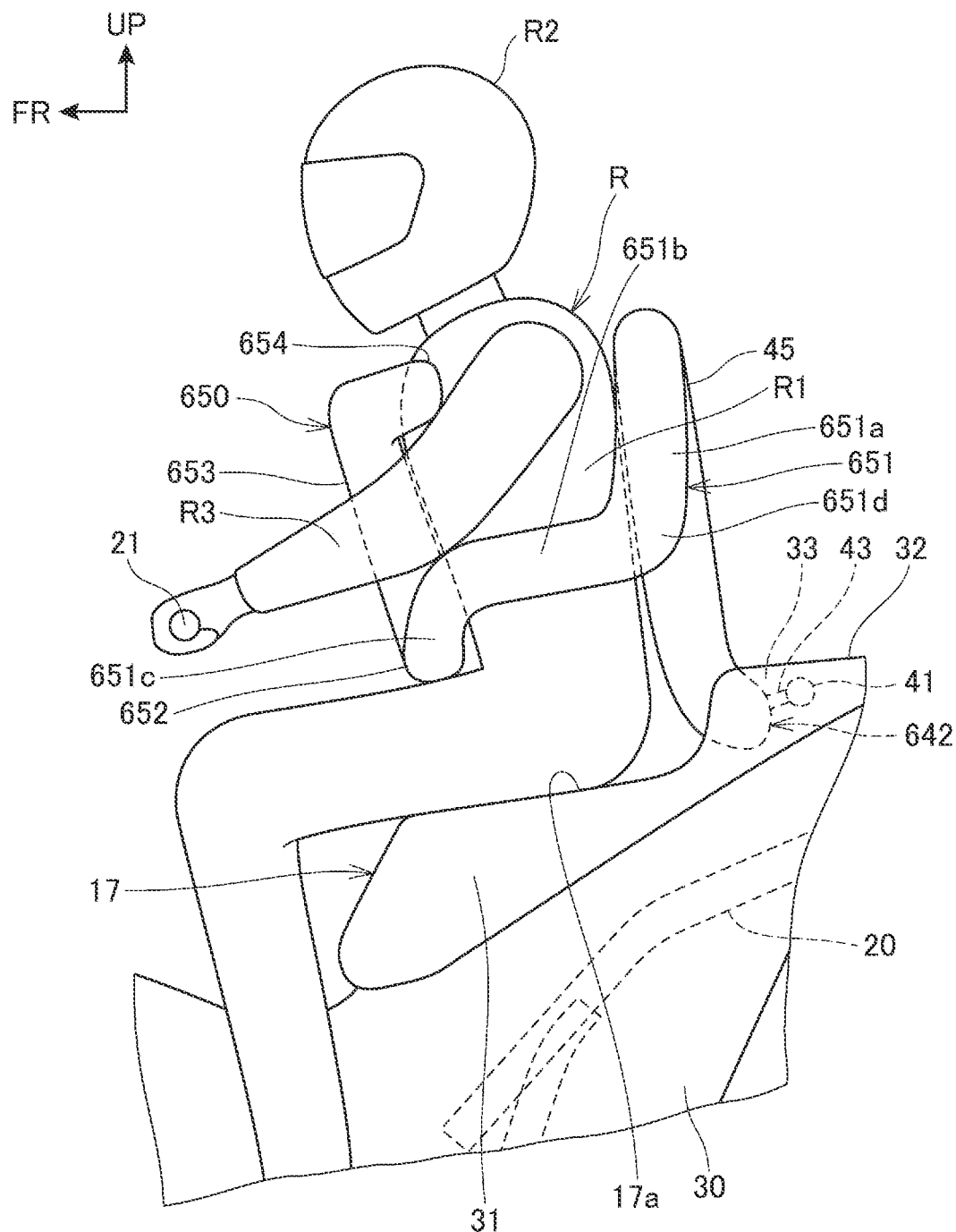
FIG. 14 is a left side view showing a state in which an airbag is deployed to protect a driver in a sixth embodiment.

FIG. 14 is a left side view showing a state in which an airbag 642 is deployed to protect a driver R in the sixth embodiment. FIG. 15 is a front view of a state, seen from the front side, in which the airbag 642 is deployed to protect a driver R.

The airbag 642 is stored in the airbag storage portion 33. The airbag 642 is connected to the inflator 41 via separating mechanism 43.

The airbag 642 includes an upwardly deploying portion 45, and a pair of left and right second deploying portions 650 that branch from a portion of the upwardly deploying portion 45 and extend forward when deployed.

Furthermore, the airbag 642 includes inflator connecting portions 46 (FIG. 5) at the lower end portion of the upwardly deploying portion 45.

The second deploying portions 650 have rod shapes that extend forward respectively from the lateral side portions located on the outer sides in the vehicle width direction of the upwardly deploying portion 45. Each second deploying portion 650 has a rod shape that is thinner than the upwardly deploying portion 45.

The second deploying portion 650 extends from the lateral side portion in the upper part of the upwardly deploying portion 45. The proximal end portion of the second deploying portion 650 communicates with the inside of the upwardly deploying portion 45.

The left and right second deploying portions 650 are provided symmetrically with respect to the center in the vehicle width direction of the upwardly deploying portion 45.

Specifically, each second deploying portion 650 includes a forwardly extending portion 651 that extends outward in the vehicle width direction and downward from the upper end portion of the upwardly deploying portion 45 and then extends forward, and an inner bending portion 652 that bends inward in the vehicle width direction from the forwardly extending portion 651 and extends inward in the vehicle width direction.

Additionally, the second deploying portion 650 includes an upwardly extending portion 653 that bends from the inner bending portion 652 and extends upward, and a rearwardly folded-back portion 654 that is folded back rearward from the upwardly extending portion 653.

Each forwardly extending portion 651 includes an outwardly-downwardly extending portion 651a extending outward in the vehicle width direction and downward from the upper end portion of the upwardly deploying portion 45, an intermediate extending portion 651b extending forward from the lower end portion 651d of the outwardly-downwardly extending portion 651a, and a forwardly-downwardly extending portion 651c extending forward and downward from the front end portion of the intermediate extending portion 651b.

Each outwardly-downwardly extending portion 651a extends outward in the vehicle width direction relative to the torso R1. Furthermore, the lower end portion 651d of the outwardly-downwardly extending portion 651a is located at a position with the same height as the middle part in the up-down direction of the upwardly deploying portion 45. In a vehicle side view, the substantially entire outwardly-downwardly extending portion 651a positionally coincides with the upwardly deploying portion 45 from the outer side in the vehicle width direction. The outwardly-downwardly extending portion 651a is proximal end portion of the second deploying portion 650. Part of the gas, which has flowed from the inflator connecting portions 46 into the upwardly deploying portion 45, flows from the outwardly-downwardly extending portion 651a into the second deploying portion 650.

Each intermediate extending portion 651b bends at the lower end portion 651d located at a position with a height of the middle part in the up-down direction of the upwardly deploying portion 45, and extends forward. The intermediate extending portion 651b extends from the lower end portion 651d to the vicinity of the front surface of the torso R1 through below the arm R3 and the outer lateral side of the torso R1. The intermediate extending portion 651b extends slightly downward toward the front in a vehicle side view. The intermediate extending portion 651b extends forward from the lower end portion 651d almost directly toward the front, but may extend to be progressively located outward in the vehicle width direction as the intermediate extending portion 651b extends forward.

Each forwardly-downwardly extending portion 651c extends forward and downward from the front end portion of the intermediate extending portion 651b to the front of the torso R1.

Each inner bending portion 652 extends inward in the vehicle width direction from the front end portion of the forwardly-downwardly extending portion 651c. The inner bending portion 652 is located below the handle 21. The inner bending portion 652 turns to the front surface side of the torso R1 and is in contact with the front surface of the torso R1.

Each upwardly extending portion 653 extends upward from the inner end portion 652a in the vehicle width direction of the inner bending portion 652. The upwardly extending portion 653 extends upward along the front surface of the torso R1. The upwardly extending portion 653 extends above the handle 21.

Each rearwardly folded-back portion 654 is folded back rearward and outward in the vehicle width direction from the upper end portion of the upwardly extending portion 653.

With the airbag 642 deployed, the airbag 642 surrounds the driver R and is in close contact with the driver R.

Specifically, the upwardly deploying portion 45 covers the torso R1 from the rear and protects the torso R1 from the rear.

The left and right forwardly extending portions 651 cover the torso R1 from the outer lateral sides below the arms R3 and protect the torso R1 from the outer lateral sides.

Each inner bending portion 652 covers the lower part of the front surface of the torso R1 from the front and protects the lower part of the front surface of the torso R1 from the front.

Each upwardly extending portion 653 covers the front surface of the torso R1 from the front and protects the torso R1 from the front.

Each rearwardly folded-back portion 654 covers at least one of the upper part of the torso R1 and the upper part of the arm R3, and protects the torso R1 and the arm R3 from the front. Furthermore, the rearwardly folded-back portion 654 is in contact with at least one of the torso R1 and the arm R3 from the front, to suppress deformation of the overall shape of the second deploying portion 650 and maintain the second deploying portion 650 in an appropriate shape.

In the airbag 642, the upwardly deploying portion 45 that protects the torso R1 from the rear is connected with the inner bending portions 652 that protect the torso R1 from the front, respectively by the forwardly extending portions 651. Therefore, one airbag 642 can protect the torso R1 from the rear and the front.

The airbag 642 has the forwardly extending portions 651 respectively passing below the arms R3 and the outer lateral sides of the torso R1, so that the airbag 642 can prevent the arms R3 and the torso R1 from getting in the way of deployment of the forwardly extending portions 651, and is properly in close contact with the driver via the left and right forwardly extending portions 651.

Figure 15:
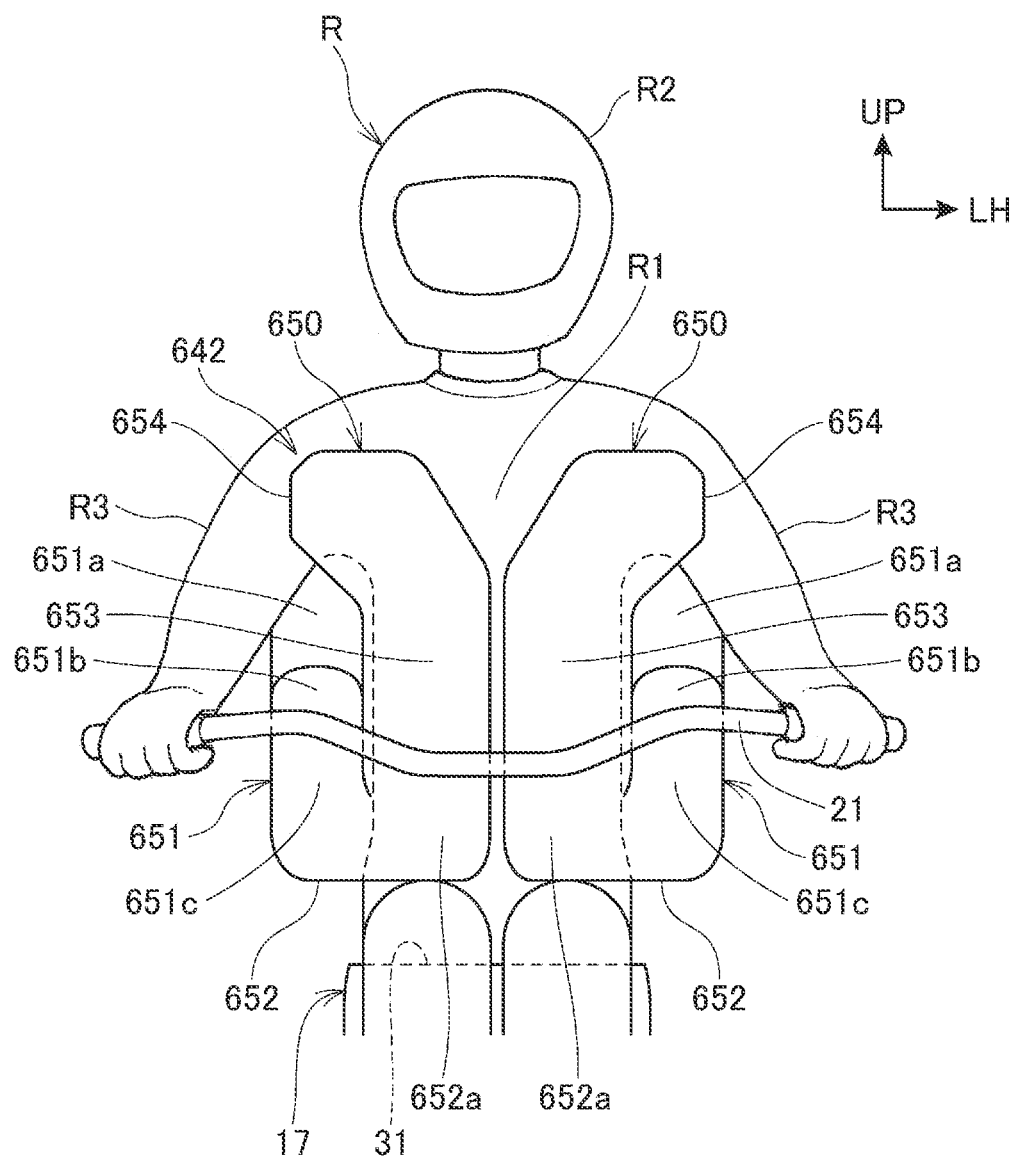
FIG. 15 is a front view of the state, seen from the front side, in which the airbag is deployed to protect the driver.

In the front view shown in FIG. 15, the inner bending portions 652 and the upwardly extending portions 653 overlap the upwardly deploying portion 45 (FIG. 14) from the front. Therefore, the inner bending portions 652 and the upwardly extending portions 653, and the upwardly deploying portion 45 can sandwich the driver R between the front and the rear, allowing the airbag 642 to be effectively in close contact with the driver R.

As described above, according to the sixth embodiment to which the present invention is applied, the airbag 642 includes the upwardly deploying portion 45 that is deployed upward when deployed, and the second deploying portions 650 that branch and extend from a portion of the upwardly deploying portion 45; and each second deploying portion 650 includes the forwardly extending portion 651 that extends outward in the vehicle width direction from the upwardly deploying portion 45 and then extends forward, and the inner bending portion 652 that bends inward in the vehicle width direction from the forwardly extending portion 651.

This configuration allows the upwardly deploying portion 45 to protect the driver R from the rear, and allows the inner bending portion 652 that bends inward in the vehicle width direction from the forwardly extending portion 651 in front of the upwardly deploying portion 45, to protect the driver R from the front. Therefore, the airbag 642 can protect the driver R from the front and rear with a simple structure.

Furthermore, each forwardly extending portion 651 extends outward in the vehicle width direction and downward from the upper part of the upwardly deploying portion 45, and bends and extends forward from a position with a height of the middle part in the up-down direction of the upwardly deploying portion 45 in a vehicle side view.

This configuration has the forwardly extending portions 651 each bending and extending forward from a position with a height of the middle part in the up-down direction of the upwardly deploying portion 45 in a vehicle side view, so that the driver R is not likely to get in the way of the deployment of the forwardly extending portions 651, and each forwardly extending portion 651 is allowed to pass through a position that is not too low to allow the second deploying portion 650 to properly protect the driver R.

Seventh Embodiment

A seventh embodiment to which the present invention is applied will be described below with reference to FIGS. 16 to 18. In the seventh embodiment, the same reference signs are given to the portions configured similarly to the portions in the above embodiment (first embodiment), and the description of the portions will be omitted.

The seventh embodiment differs from the above embodiments in that a second deploying portion 750 having a shape different from that of the second deploying portion 50 is provided.

Figure 16:
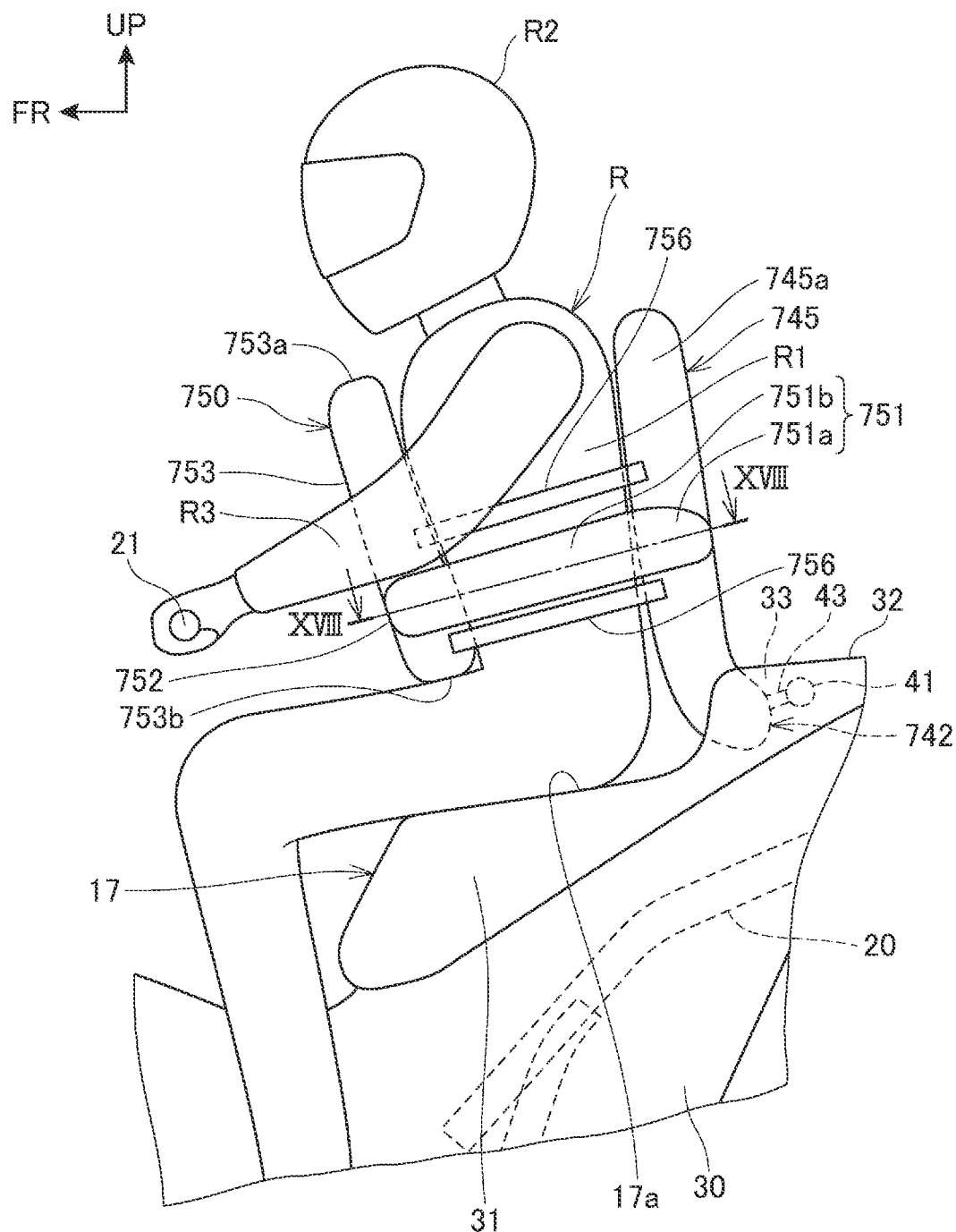
FIG. 16 is a left side view showing a state in which an airbag is deployed to protect a driver in a seventh embodiment.

FIG. 16 is a left side view showing a state in which an airbag 742 is deployed to protect a driver R in the seventh embodiment. FIG. 17 is a front view of the state, seen from the front side, in which the airbag 742 is deployed to protect the driver R. FIG. 18 is a cross-sectional view taken along a line XVIII-XVIII of FIG. 16.

The airbag 742 is stored in the airbag storage portion 33. The airbag 742 is connected to the inflator 41 via separating mechanism 43.

The airbag 742 includes an upwardly deploying portion 745, and a pair of left and right second deploying portions 750 that branch from a portion of the upwardly deploying portion 745 and extend forward when deployed.

Furthermore, the airbag 742 includes inflator connecting portions 46 (FIG. 5) at the lower end portion of the upwardly deploying portion 745.

As seen from the rear side, the upwardly deploying portion 745 has a rectangular shape extending upward from the airbag storage portion 33, similarly to the upwardly deploying portion 45 (FIG. 4) of the above embodiment, and is longer in the up-down direction than in the vehicle width direction (left-right direction).

The upwardly deploying portion 745 is disposed at the center in the vehicle width direction, and covers substantially the entire rear surface of the torso R1 of the driver R from the rear. The upwardly deploying portion 745 extends upward to the vicinity of the head R2 of the driver R.

The upwardly deploying portion 745 is separated by a partition portion 745a (FIG. 18), provided at the center in the vehicle width direction, into a one-side extending portion 745b disposed on one side of the left and right (left side) and the other-side extending portion 745c disposed on the other side of the left and right (right side).

The partition portion 745a has a linear shape that extends up and down over substantially the entire up-down length of the upwardly deploying portion 745 as seen from the rear side.

The one-side extending portion 745b and the other-side extending portion 745c extend linearly upward along the partition portion 745a.

A gas chamber into which the gas from the inflator 41 flows into the upwardly deploying portion 745 is divided by the partition portion 745a into a gas chamber of one-side extending portion 745b and a gas chamber of the other-side extending portion 745c.

A connecting member 748 is attached to the front surface of the upwardly deploying portion 745 to connect the one-side extending portion 745b and the other-side extending portion 745c in the vehicle width direction. The connecting member 748 is a belt-shaped string that extends in the vehicle width direction so as to cross the partition portion 745a.

Figure 18:
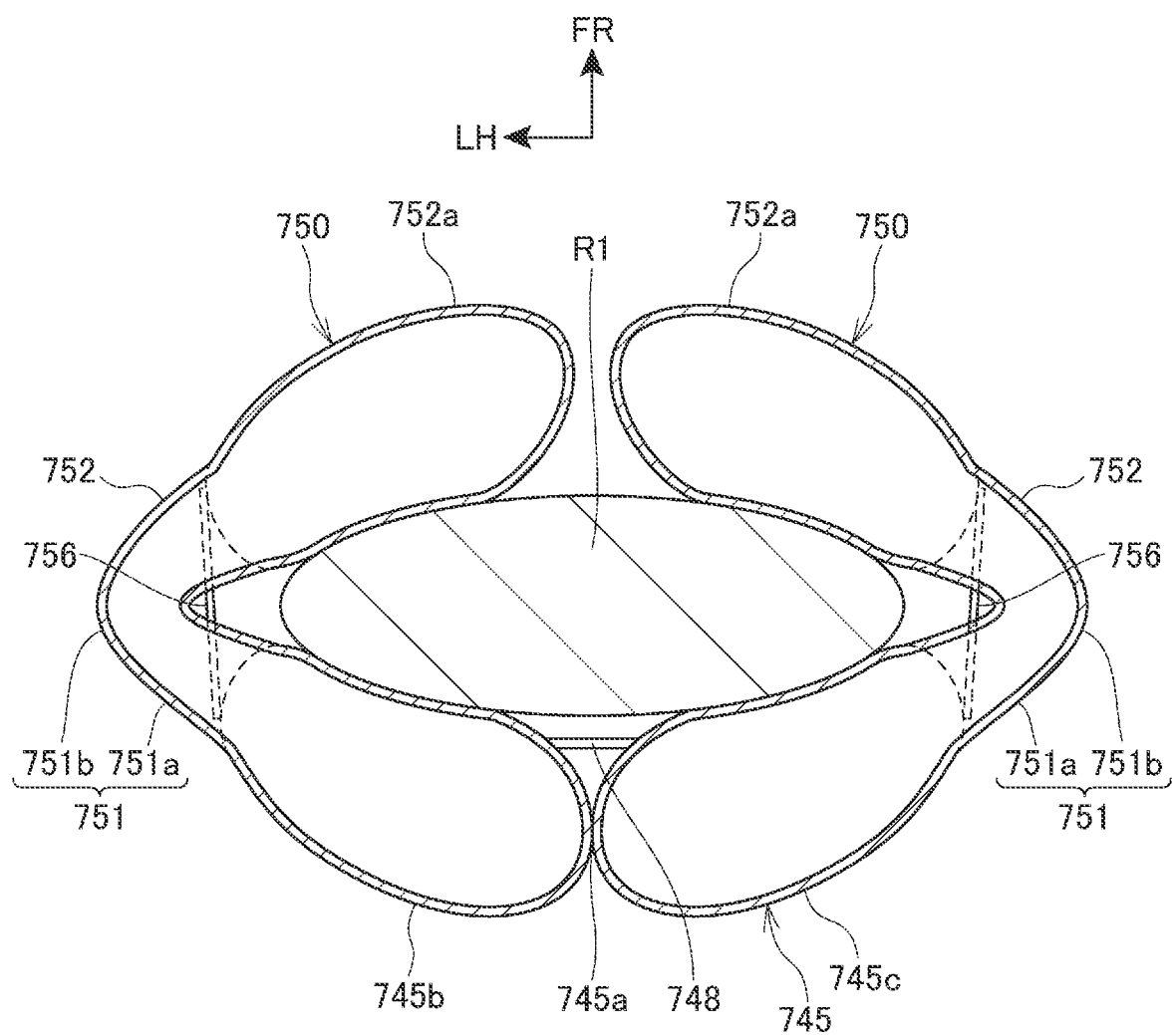
FIG. 18 is a cross-sectional view taken along a line XVIII-XVIII of FIG. 16.

In a deployed state, the upwardly deploying portion 745 bends in a V-shape from the partition portion 745a in a top view as shown in FIG. 18. The upwardly deploying portion 745 bends into a V-shape at the partition portion 745a serving as a bending line. As a result, the front surface of the upwardly deploying portion 745 has a V-shape along the rear surface of the torso R1 in the deployed state. This allows the upwardly deploying portion 745 to be properly in close contact with the torso R1.

The connecting member 748 restricts the degree of bending of the upwardly deploying portion 745 in the deployed state, and makes the upwardly deploying portion 745 into a proper V-shape. This allows the upwardly deploying portion 745 to be properly in close contact with the torso R1.

The second deploying portions 750 have rod shapes that extend forward respectively from the lateral side portions located on the outer sides in the vehicle width direction of the upwardly deploying portion 745. Each second deploying portion 750 has a rod shape that is thinner than the upwardly deploying portion 745.

The second deploying portion 750 extends from the lateral side portion of the middle part in the up-down direction of the upwardly deploying portion 745. Specifically, the second deploying portion 750 on the left side extends from the lateral side portion of the one-side extending portion 745b, and the second deploying portion 750 on the right side extends from the lateral side portion of the other-side extending portion 745c.

The proximal end portion of the second deploying portion 750 communicates with the inside of the upwardly deploying portion 745. The left and right second deploying portions 750 are provided symmetrically with respect to the center in the vehicle width direction of the upwardly deploying portion 745.

Specifically, each second deploying portion 750 includes a forwardly extending portion 751 that extends outward in the vehicle width direction from the lateral side portion of the middle part in the up-down direction of the upwardly deploying portion 745 and then extends forward, and an inner bending portion 752 that bends inward in the vehicle width direction from the forwardly extending portion 751 and extends inward in the vehicle width direction.

Additionally, each second deploying portion 750 includes an upwardly-downwardly extending portion 753 that extends upward and downward form the inner bending portion 752.

Each forwardly extending portion 751 includes a laterally extending portion 751a extending outward in the vehicle width direction from the middle part in the up-down direction of the upwardly deploying portion 745, and a forwardly extending portion body 751b extending forward from the laterally extending portion 751a. The laterally extending portion 751a extends outward in the vehicle width direction relative to the torso R1.

The laterally extending portion 751a is the proximal end portion of the second deploying portion 750. Part of the gas, which has flowed from the inflator connecting portions 46 into the upwardly deploying portion 745, flows from the laterally extending portion 751a into the second deploying portion 750.

Each forwardly extending portion body 751b has a rod shape that extends forward from the laterally extending portion 751a in a vehicle side view. The forwardly extending portion body 751b extends slightly downward toward the front in a vehicle side view.

The forwardly extending portion body 751b extends forward from the laterally extending portion 751a to the vicinity of the front surface of the torso R1 through below the arm R3 and the outer lateral side of the torso R1.

The forwardly extending portion body 751b extends to be progressively located outward in the vehicle width direction as the forwardly extending portion body 751b extends forward from the laterally extending portion 751a.

Each inner bending portion 752 extends inward in the vehicle width direction from the front end portion of the forwardly extending portion body 751b. The inner bending portion 752 turns to the front surface side of the torso R1 and is in contact with the front surface of the torso R1.

Each upwardly-downwardly extending portion 753 extends upward and downward from the inner end portion 752a in the vehicle width direction of the inner bending portion 752. The upwardly-downwardly extending portion 753 extends upward and downward along the front surface of the torso R1. The upper end portion 753a of the upwardly-downwardly extending portion 753 extends to the upper part of the torso R1, and the lower end portion 753b of the upwardly-downwardly extending portion 753 extends to the lower part of the torso R1. Each upwardly-downwardly extending portion 753 extends upward and downward relative to the handle 21.

With reference to FIGS. 16 and 18, each second deploying portion 750 has a front-rear connecting members 756 attached thereto that connect the outer side surface of the upwardly deploying portion 745 and the outer side surface of the upwardly-downwardly extending portion 753 in the front-rear direction. Each front-rear connecting member 756 is a belt-shaped string extending in the front-rear direction along the forwardly extending portion body 751b. The front-rear connecting members 756 are respectively provided above and below the forwardly extending portion body 751b in a vehicle side view.

The front-rear connecting members 756 restrict the degree of bending of each inner bending portion 752 with respect to the forwardly extending portion body 751b, and prevent the inner bending portion 752 from opening too much with respect to the forwardly extending portion body 751b. Thereby, the inner bending portion 752 can be appropriately in contact with the front surface of the torso R1.

With the airbag 742 deployed, the airbag 742 surrounds the driver R and is in close contact with the driver R.

Specifically, the upwardly deploying portion 745 covers the torso R1 from the rear and protects the torso R1 from the rear.

The left and right forwardly extending portions 751 cover the torso R1 from the outer lateral sides below the arms R3 and protect the torso R1 from the outer lateral sides.

Each inner bending portion 752 and upwardly-downwardly extending portion 753 cover the front surface of the torso R1 from the front and protect the front surface of the torso R1 from the front.

In the airbag 742, the upwardly deploying portion 745 that protects the torso R1 from the rear is connected with the inner bending portions 752 that protect the torso R1 from the front, respectively by the forwardly extending portions 751. Therefore, one airbag 742 can protect the torso R1 from the rear and the front.

The airbag 742 has the forwardly extending portions 751 respectively passing below the arms R3 and the outer lateral sides of the torso R1, so that the airbag 742 can prevent the arms R3 and the torso R1 from getting in the way of deployment of the forwardly extending portions 751, and is properly in close contact with the driver via the left and right forwardly extending portions 751.

Figure 17:
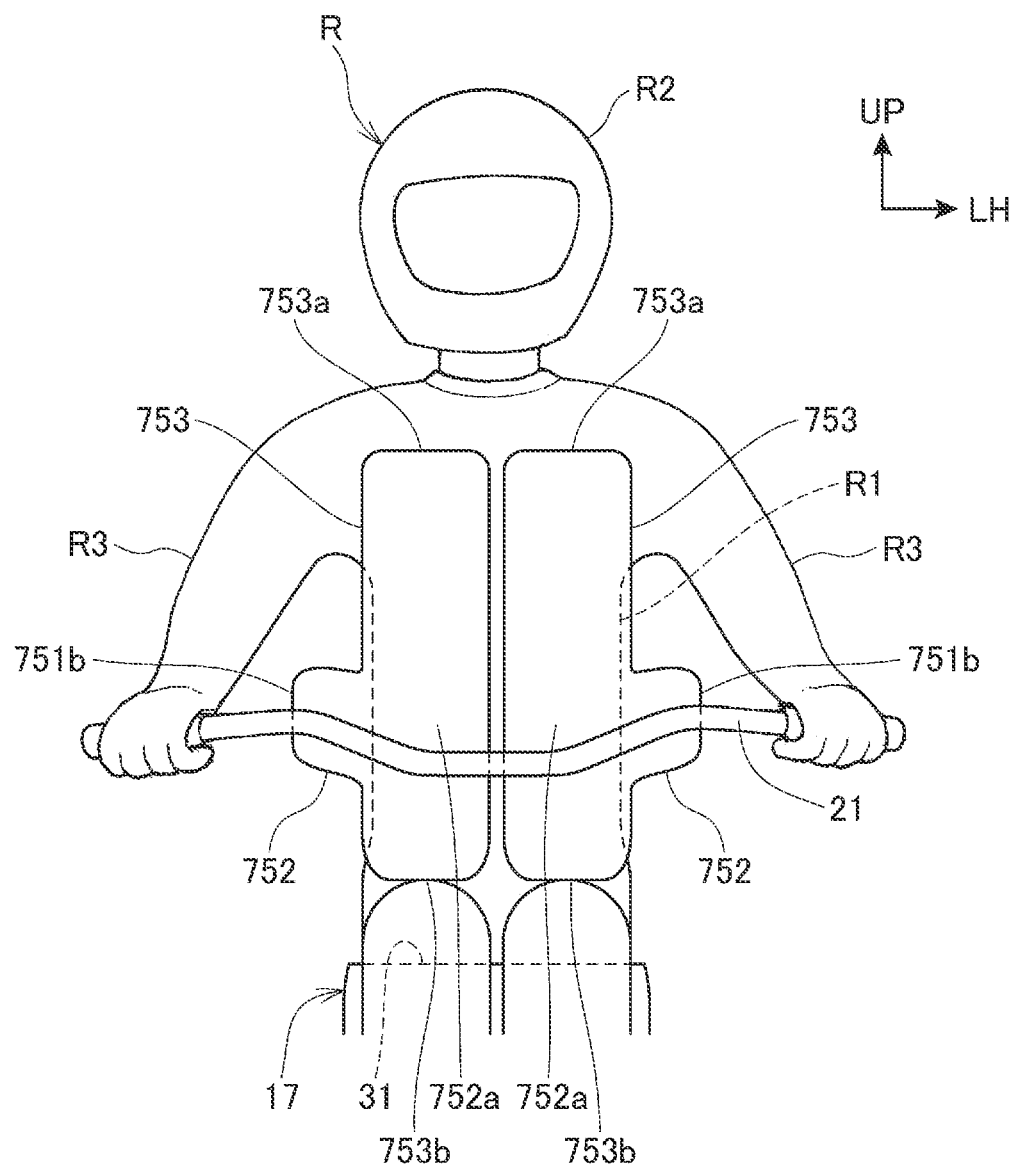
FIG. 17 is a front view of the state, seen from the front side, in which the airbag is deployed to protect the driver.

In the front view shown in FIG. 17, the inner bending portions 752 and upwardly-downwardly extending portions 753 overlap the upwardly deploying portion 745 (FIGS. 16 and 18) from the front. Therefore, the inner bending portions 752 and the upwardly-downwardly extending portions 753, and the upwardly deploying portion 745 can sandwich the driver R between the front and the rear, allowing the airbag 742 to be effectively in close contact with the driver R.

As described above, according to the seventh embodiment to which the present invention is applied, the airbag 742 includes the upwardly deploying portion 745 that is deployed upward when deployed, and the second deploying portions 750 that branch and extend from a portion of the upwardly deploying portion 745; and each second deploying portion 750 includes the forwardly extending portion 751 that extends outward in the vehicle width direction from the upwardly deploying portion 745 and then extends forward, and the inner bending portion 752 that bends inward in the vehicle width direction from the forwardly extending portion 751.

This configuration allows the upwardly deploying portion 745 to protect the driver R from the rear, and allows the inner bending portion 752 that bends inward in the vehicle width direction from the forwardly extending portion 751 in front of the upwardly deploying portion 745, to protect the driver R from the front. Therefore, the airbag 742 can protect the driver R from the front and rear with a simple structure.

Furthermore, each forwardly extending portion 751 extends from the middle part in the up-down direction of the upwardly deploying portion 745.

This configuration has the forwardly extending portions 751 extending from the middle part in the up-down direction of the upwardly deploying portion 745, so that the driver R is not likely to get in the way of the deployment of the forwardly extending portions 751, and each forwardly extending portion 751 is allowed to pass through a position that is not too low to allow the second deploying portion 750 to properly protect the driver R.

In the above seventh embodiment, each second deploying portion 750 includes the forwardly extending portion 751. However, instead of the forwardly extending portion 751, the second deploying portion 750 may include a second forwardly extending portion extending forward from the upwardly deploying portion 245 (corresponding to upwardly deploying portion 745 here) as shown in FIG. 6, or a second forwardly extending portion extending forward and outward from the upwardly deploying portion 245 (corresponding to upwardly deploying portion 745 here) as shown in FIG. 7. In this case, in a vehicle side view, the second forwardly extending portion extends forward from the middle part in the up-down direction of the upwardly deploying portion 245 in a posture slightly downward toward the front, and the inner bending portion 752 extends inward in the vehicle width direction from the front end portion of the second forwardly extending portion, as shown in FIG. 16.

Eighth Embodiment

An eighth embodiment to which the present invention is applied will be described below with reference to FIGS. 19 and 20. In the eighth embodiment, the same reference signs are given to the portions configured similarly to the portions in the above embodiment (first embodiment), and the description of the portions will be omitted.

The eighth embodiment differs from the above embodiments in that the airbag 42 is provided in rider equipment 871 worn by the rider R.

Figure 19:
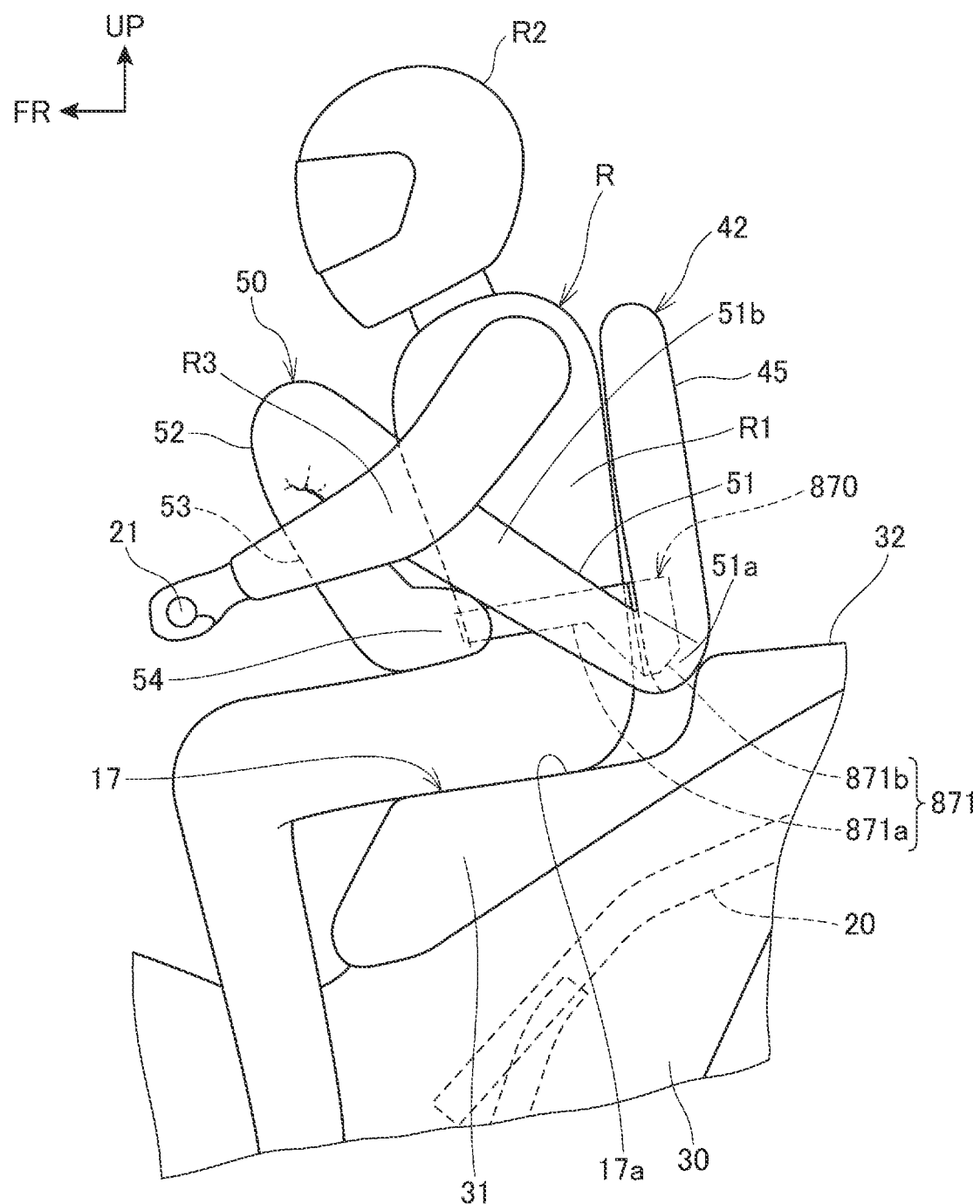
FIG. 19 is a left side view showing a state in which an airbag is deployed to protect a rider in an eighth embodiment.

FIG. 19 is a left side view showing a state in which an airbag 42 is deployed to protect a rider R in the eighth embodiment. FIG. 20 is a rear view of the state, seen from the rear side, in which the airbag 42 is deployed to protect the rider R.

The rider protection equipment 870 includes a rider equipment 871 worn by the rider R, and an airbag 42 supported by the rider equipment 871.

The rider equipment 871 is a belt that is detachably attached to the lower part of the torso R1.

The rider equipment 871 includes a belt-shaped belt portion 871a that wraps around the outer periphery of the torso R1, and a case-shaped airbag storage portion 871b provided on the rear surface of the belt portion 871a. The airbag storage portion 871b is located behind the lower part of the torso R1.

The airbag 42 is stored in the airbag storage portion 871b in a folded state. Furthermore, the inflator 41 (FIG. 1) is also stored in the airbag storage portion 871b. The airbag 42 is located behind the lower part of the torso R1.

The airbag 42 is deployed upward and forward from the airbag storage portion 871b.

With the airbag 42 deployed, the airbag 42 surrounds the rider R and is in close contact with the rider R.

Figure 20:
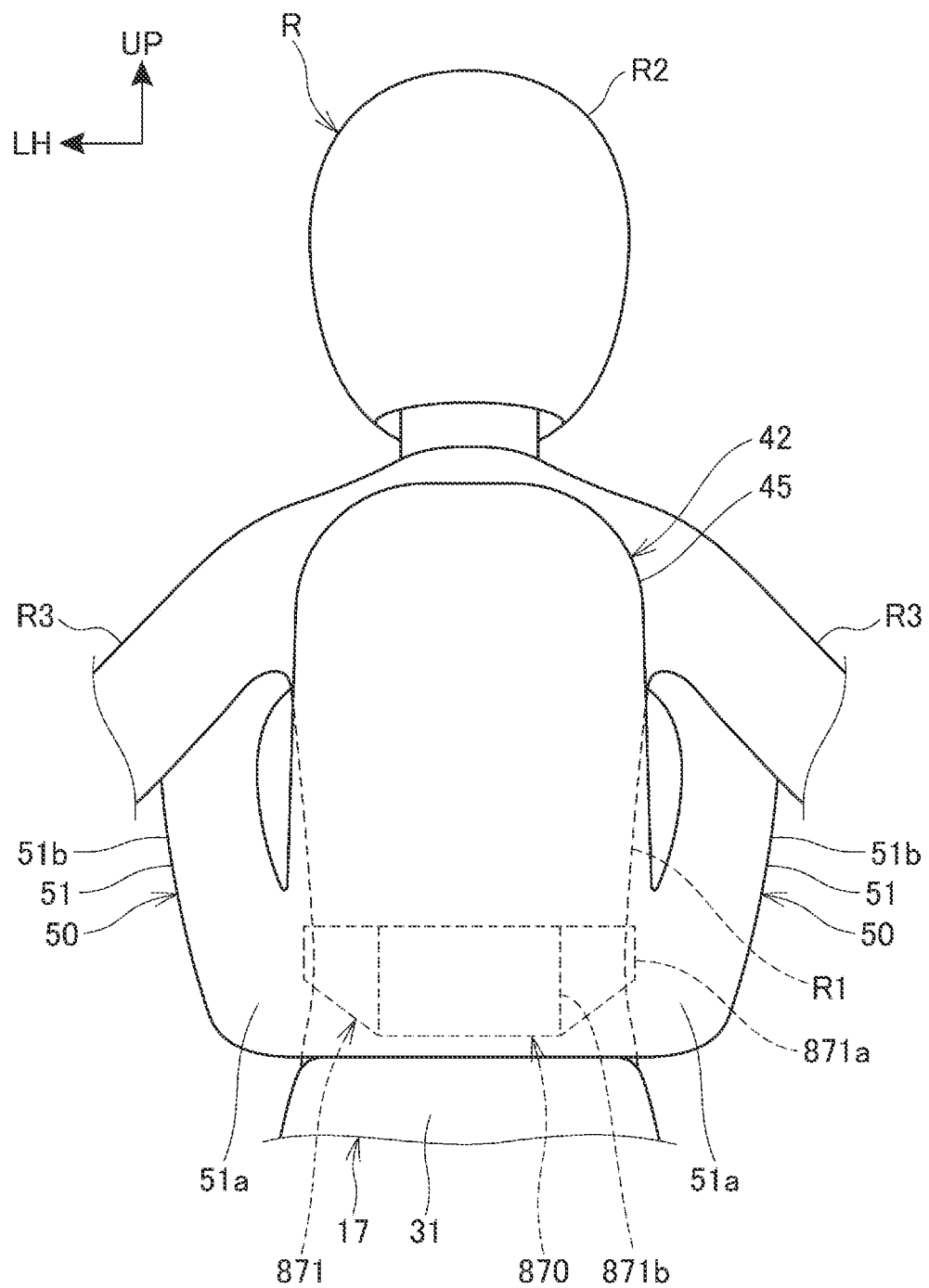
FIG. 20 is a rear view of the state, seen from the rear side, in which the airbag is deployed to protect the rider.

The deployed state of the airbag 42 of the rider equipment 871 shown in FIGS. 19 and 20 is the same as that in the above embodiment (see FIGS. 2 to 4), so detailed description will be omitted here.

As described above, according to the eighth embodiment to which the present invention is applied, the rider protection equipment 870 includes the rider equipment 871 worn by the rider R who rides on the saddled vehicle 10, and the airbag 42; the airbag 42 is supported by the rider equipment 871 and is located on the rear surface side of the torso R1 of the rider R; the airbag 42 includes an upwardly deploying portion 45 that is deployed upward when deployed, and the second deploying portions 50 that branch and extend from a portion of the upwardly deploying portion 45; and each second deploying portion 50 includes the forwardly extending portion 51 that extends outward in the vehicle width direction from the upwardly deploying portion 45 and then extends forward, and an inner bending portion 52 that bends inward in the vehicle width direction from the forwardly extending portion 51.

This configuration allows the upwardly deploying portion 45 to protect the driver R from the rear, and allows the inner bending portions 52, each of which bends inward in the vehicle width direction from the forwardly extending portion 51 extending forward from the upwardly deploying portion 45, to protect the driver R from the front. Therefore, a simple structure using one airbag 42 allows the airbag 42 to protect the driver R from the front and the rear. Furthermore, the airbag 42 is stored in the airbag storage portion 871b when not operated, and is deployed when protecting the rider R. Therefore, air permeability is better than, for example, an airbag that is constantly worn by the rider R in a deployed state.

Note that in the eighth embodiment, instead of the airbag 42, any of the airbag 242 (FIG. 6, FIG. 7), the airbag 342 (FIG. 8), the airbag 442 (FIG. 10), the airbag 542 (FIG. 12), the airbag 642 (FIG. 14), and the airbag 742 (FIG. 16) may be provided in the airbag storage portion 871b.

Ninth Embodiment

A ninth embodiment to which the present invention is applied will be described below with reference to FIG. 21. In the ninth embodiment, the same reference signs are given to the portions configured similarly to the portions in the above embodiment (first embodiment), and the description of the portions will be omitted.

The ninth embodiment differs from the above embodiments in that the airbag 42 is provided in rider equipment 971 worn by the rider R.

Figure 21:
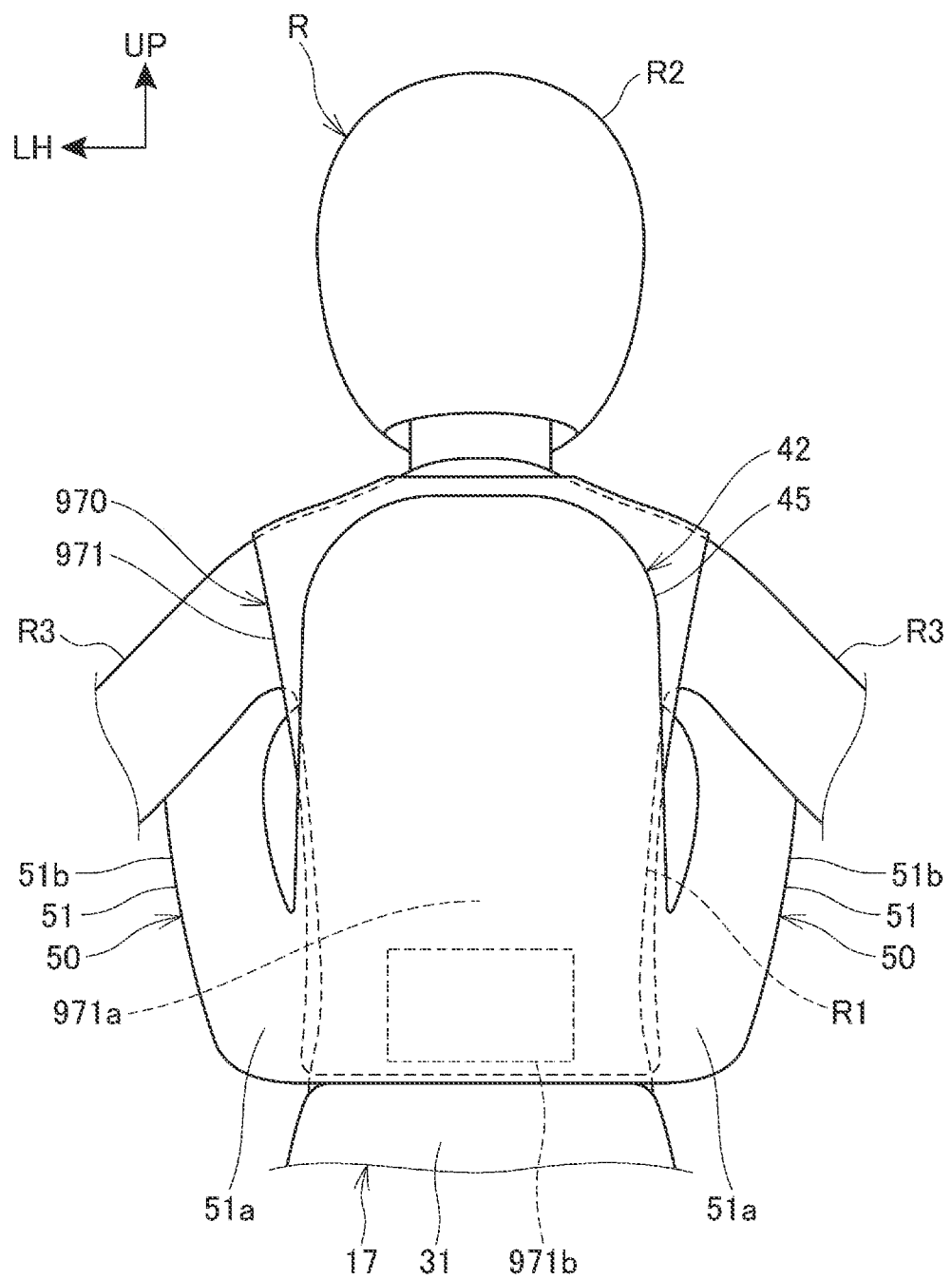
FIG. 21 is a rear view of a state, seen from the rear side, in which an airbag is deployed to protect a rider in a ninth embodiment.

FIG. 21 is a rear view of a state, seen from the rear side, in which an airbag 42 is deployed to protect a rider R in the ninth embodiment.

The rider protection equipment 970 includes rider equipment 971 worn by the rider R, and an airbag 42 supported by the rider equipment 971.

The rider equipment 971 is a jacket that is detachably attached to the torso R1. This jacket is, for example, a vest type jacket.

The rider equipment 971 includes a case-shaped airbag storage portion 971b at the lower part of a jacket rear surface portion 971a that covers the torso R1 from the rear. The airbag storage portion 971b is located behind the lower part of the torso R1.

The airbag 42 is stored in the airbag storage portion 971b in a folded state. Furthermore, the inflator 41 (FIG. 1) is also stored in the airbag storage portion 971b. The airbag 42 is located behind the lower part of the torso R1.

Note that the airbag storage portion 971b may be a pocket provided in the jacket for the airbag 42. Alternatively, the airbag storage portion 971b may be a fastener such as a button or a zipper that allows the airbag 42 to be attached to the jacket.

The airbag 42 is deployed upward and forward from the airbag storage portion 971b.

With the airbag 42 deployed, the airbag 42 surrounds the rider R and is in close contact with the rider R.

The deployed state of the airbag 42 of the rider equipment 971 shown in FIG. 21 is the same as that in the above embodiment (see FIGS. 2 to 4), so detailed description will be omitted here.

As described above, according to the ninth embodiment to which the present invention is applied, the rider protection equipment 970 includes the rider equipment 971 worn by the rider R who rides on the saddled vehicle 10, and the airbag 42; the airbag 42 is supported by the rider equipment 971 and is located on the rear surface side of the torso R1 of the rider R; the airbag 42 includes an upwardly deploying portion 45 that is deployed upward when deployed, and the second deploying portions 50 that branch and extend from a portion of the upwardly deploying portion 45; and each second deploying portion 50 includes the forwardly extending portion 51 that extends outward in the vehicle width direction from the upwardly deploying portion 45 and then extends forward, and an inner bending portion 52 that bends inward in the vehicle width direction from the forwardly extending portion 51.

This configuration allows the upwardly deploying portion 45 to protect the driver R from the rear, and allows the inner bending portions 52, each of which bends inward in the vehicle width direction from the forwardly extending portion 51 extending forward from the upwardly deploying portion 45, to protect the driver R from the front. Therefore, a simple structure using one airbag 42 allows the airbag 42 to protect the driver R from the front and the rear. Furthermore, the airbag 42 is stored in the airbag storage portion 971b when not operated, and is deployed when protecting the rider R. Therefore, air permeability is better than, for example, an airbag that is constantly worn by the rider R in a deployed state.

Note that in the ninth embodiment, instead of the airbag 42, any of the airbag 242 (FIG. 6, FIG. 7), the airbag 342 (FIG. 8), the airbag 442 (FIG. 10), the airbag 542 (FIG. 12), the airbag 642 (FIG. 14), and the airbag 742 (FIG. 16) may be provided in the airbag storage portion 971b.

[Configurations Supported by Above Embodiments]

The above embodiments support the following configurations.

(Configuration 1)

A saddled vehicle includes: a seat for a rider; and an airbag provided behind the seat or in a rear part of the seat, in which the airbag includes an upwardly deploying portion that is deployed upward when deployed, and a second deploying portion that branches and extends from a portion of the upwardly deploying portion, the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and the second deploying portion includes an inner bending portion that bends inward in the vehicle width direction from the forwardly extending portion or the second forwardly extending portion.

This configuration allows the upwardly deploying portion to protect the rider from the rear, and allows the inner bending portion, which bends inward in the vehicle width direction from the forwardly extending portion or the second forwardly extending portion in front of the upwardly deploying portion, to protect the rider from the front. Therefore, the airbag can protect the rider from the front and rear with a simple structure.

(Configuration 2)

The saddled vehicle according to Configuration 1, in which at least a portion of the inner bending portion overlaps the upwardly deploying portion in a vehicle front-rear direction.

This configuration allows the inner bending portion and the upwardly deploying portion to sandwich the rider in the vehicle front-rear direction, and allows the airbag to be properly in close contact with the rider to protect the rider.

(Configuration 3)

The saddled vehicle according to Configuration 1 or 2, in which the forwardly extending portion and the second forwardly extending portion extend to be progressively located outward in the vehicle width direction as the forwardly extending portion and the second forwardly extending portion extend forward.

This configuration allows the forwardly extending portion and the second forwardly extending portion to be properly deployed forward along the rider.

(Configuration 4)

The saddled vehicle according to any of Configurations 1 to 3, in which the second deploying portion includes a downwardly extending portion that bends from the inner bending portion and extends downward.

This configuration allows the downwardly extending portion, which extends downward from the inner bending portion, to protect the rider over a large area in the up-down direction.

(Configuration 5)

The saddled vehicle according to Configuration 4, in which the forwardly extending portion and the second forwardly extending portion extend diagonally forward and upward in a vehicle side view.

This configuration allows the downwardly extending portion to extend downward from a high position, allowing the rider to be protected over a large area in the up-down direction. For example, even if the airbag is disposed at a low position, the forwardly extending portion and the second forwardly extending portion extend diagonally forward and upward, allowing the rider to be protected over a large area in the up-down direction. Therefore, the degree of freedom in disposing the airbag can be improved. Furthermore, since the forwardly extending portion and the second forwardly extending portion extend diagonally, the forwardly extending portion and the second forwardly extending portion cover the rider in a larger area, allowing the rider to be properly protected.

(Configuration 6)

The saddled vehicle according to Configuration 4 or 5, in which the second deploying portion includes a folded-back portion that is folded back from the downwardly extending portion toward the forwardly extending portion or the second forwardly extending portion.

This configuration allows the folded-back portion to protect the rider. Furthermore, the folded-back portion is in contact with the forwardly extending portion or the second forwardly extending portion, allowing for easily maintaining the second deploying portion in an appropriate shape.

(Configuration 7)

The saddled vehicle according to any of Configurations 1 to 3, in which the second deploying portion includes an upwardly extending portion that bends and extends upward from the inner bending portion.

This configuration allows the upwardly extending portion, which extends upward from the inner bending portion, to protect the rider over a large area in the up-down direction.

(Configuration 8)

The saddled vehicle according to Configuration 7, in which the forwardly extending portion and the second forwardly extending portion extend diagonally forward and downward in a vehicle side view.

This configuration allows the upwardly extending portion to extend upward from a low position, allowing the rider to be protected over a large area in the up-down direction. Furthermore, since the forwardly extending portion and the second forwardly extending portion extend diagonally, the forwardly extending portion and the second forwardly extending portion cover the rider in a larger area, allowing the rider to be properly protected.

(Configuration 9)

The saddled vehicle according to Configuration 8, in which the second deploying portion includes a second folded-back portion that is folded back from the upwardly extending portion toward the forwardly extending portion or the second forwardly extending portion.

This configuration allows the second folded-back portion to protect the rider. Furthermore, the second folded-back portion is in contact with any of the forwardly extending portion, the second forwardly extending portion, and the rider, allowing for easily maintaining the second deploying portion in an appropriate shape.

(Configuration 10)

The saddled vehicle according to any of Configurations 1 to 3, in which the forwardly extending portion extends outward in the vehicle width direction and upward from a lower part of the upwardly deploying portion, and bends and extends forward from a position with a height of a middle part in an up-down direction of the upwardly deploying portion in a vehicle side view.

This configuration has the forwardly extending portion bending and extending forward from a position with a height of the middle part in the up-down direction of the upwardly deploying portion in a vehicle side view, so that the rider is not likely to get in the way of the deployment of the forwardly extending portion, and the forwardly extending portion is allowed to pass through a position that is not too low to allow the second deploying portion to properly protect the rider.

(Configuration 11)

The saddled vehicle according to any of Configurations 1 to 3, in which the forwardly extending portion extends outward in the vehicle width direction and downward from an upper part of the upwardly deploying portion, and bends and extends forward from a position with a height of a middle part in an up-down direction of the upwardly deploying portion in a vehicle side view.

This configuration has the forwardly extending portion bending and extending forward from a position with a height of the middle part in the up-down direction of the upwardly deploying portion in a vehicle side view, so that the rider is not likely to get in the way of the deployment of the forwardly extending portion, and the forwardly extending portion is allowed to pass through a position that is not too low to allow the second deploying portion to properly protect the rider.

(Configuration 12)

The saddled vehicle according to any of Configurations 1 to 3, in which the forwardly extending portion and the second forwardly extending portion extend from a middle part in an up-down direction of the upwardly deploying portion.

This configuration has the forwardly extending portion and the second forwardly extending portion each extending from the middle part in the up-down direction of the upwardly deploying portion, so that the rider is not likely to get in the way of the deployment of the forwardly extending portion and the second forwardly extending portion, and the forwardly extending portion and the second forwardly extending portion are each allowed to pass through a position that is not too low to allow the second deploying portion to properly protect the rider.

(Configuration 13)

The saddled vehicle according to Configuration 12, in which the second deploying portion includes an upwardly-downwardly extending portion that extends upwardly and downwardly from the inner bending portion.

This configuration allows the upwardly-downwardly extending portion extending upward and downward from the inner bending portion to allow the rider to be protected over a large area in the up-down direction.

(Configuration 14)

The saddled vehicle according to any of Configurations 1 to 13, in which the upwardly deploying portion is deployed upward along a rear surface of a torso of a rider sitting on the seat, the second deploying portion extends forward through below an arm and an outer lateral side of the torso of the rider sitting on the seat and grasping a handle for steering, and covers the torso from a front.

This configuration allows the second deploying portion to extend to the front side of the torso through below the arms and the outer lateral side of the torso of the rider. The upwardly deploying portion can protect the torso of the rider from the rear, and the second deploying portion can protect the torso from the front and the outer lateral side. The second deploying portion has a size that allows it to pass below the arm and the outer lateral side of the torso, allowing the second deploying portion to be compact.

(Configuration 15)

The saddled vehicle according to any of Configurations 1 to 14, in which an inflator that jets gas into the airbag to deploy the airbag is connected to the airbag, and a separating mechanism is provided that separates the airbag from the inflator after the airbag is deployed.

This configuration causes the airbag to be separated from the inflator after the airbag is deployed, preventing the airbag from being shifted downward by the inflator after the airbag is deployed. Therefore, the airbag can be properly in close contact with the rider.

(Configuration 16)

Rider protection equipment includes: rider equipment, worn by a rider riding on a vehicle; and an airbag, in which the airbag is supported by the rider equipment and is located on a rear surface side of a torso of the rider, the airbag includes an upwardly deploying portion that is deployed upward when deployed, and a second deploying portion that branches and extends from a portion of the upwardly deploying portion, the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and the second deploying portion includes an inner bending portion that bends inward in the vehicle width direction from the forwardly extending portion or the second forwardly extending portion.

This configuration allows the upwardly deploying portion to protect the rider from the rear, and allows the inner bending portion, which bends inward in the vehicle width direction from the forwardly extending portion or the second forwardly extending portion in front of the upwardly deploying portion, to protect the rider from the front. Therefore, the airbag can protect the rider from the front and rear with a simple structure.

REFERENCE SIGNS LIST 10 saddled vehicle (vehicle)
17 seat
21 handle
41 inflator
42, 242, 342, 442, 542, 642, 742 airbag
43 separating mechanism
45, 245, 745 upwardly deploying portion
50, 250, 250', 350, 450, 550, 650, 750 second deploying portion 51, 351, 451, 551, 651, 751 forwardly extending portion
52, 352, 452, 552, 652, 752 inner bending portion
53 downwardly extending portion
54 folded-back portion
251, 251' second forwardly extending portion
353, 453, 553, 653 upwardly extending portion
454 second folded-back portion
753 upwardly-downwardly extending portion
870, 970 rider protection equipment
871, 971 rider equipment
R driver (rider)
R1 torso
R3 arm

The invention claimed is:

1. A saddled vehicle comprising:
a seat for a rider; and
an airbag provided behind the seat or in a rear part of the seat, wherein
the airbag includes an upwardly deploying portion that is deployed upward along a rear surface of a torso of a rider sitting on the seat, and a second deploying portion that branches and extends from a portion of the upwardly deploying portion,
the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and
the second deploying portion extends forward through below an arm and an outer lateral side of the torso of the rider sitting on the seat and grasping a handle for steering, and further covers the torso from a front via an inner bending portion that bends inward in the vehicle width direction.

2. The saddled vehicle according to claim 1, wherein at least a portion of the inner bending portion overlaps the upwardly deploying portion in a vehicle front-rear direction.

3. The saddled vehicle according to claim 1, wherein the forwardly extending portion and the second forwardly extending portion extend to be progressively located outward in the vehicle width direction as the forwardly extending portion and the second forwardly extending portion extend forward.

4. The saddled vehicle according to claim 1, wherein the second deploying portion includes a downwardly extending portion that bends from the inner bending portion and extends downward.

5. The saddled vehicle according to claim 4, wherein the forwardly extending portion and the second forwardly extending portion extend diagonally forward and upward in a vehicle side view.

6. The saddled vehicle according to claim 4, wherein the second deploying portion includes a folded-back portion that is folded back from the downwardly extending portion toward the forwardly extending portion or the second forwardly extending portion.

7. The saddled vehicle according to claim 1, wherein the second deploying portion includes an upwardly extending portion that bends and extends upward from the inner bending portion.

8. The saddled vehicle according to claim 7, wherein the forwardly extending portion and the second forwardly extending portion extend diagonally forward and downward in a vehicle side view.

9. The saddled vehicle according to claim 8, wherein the second deploying portion includes a second folded-back portion that is folded back from the upwardly extending portion toward the forwardly extending portion or the second forwardly extending portion.

10. The saddled vehicle according to claim 1, wherein the forwardly extending portion extends outward in the vehicle width direction and upward from a lower part of the upwardly deploying portion, and bends and extends forward from a position with a height of a middle part in an up-down direction of the upwardly deploying portion in a vehicle side view.

11. The saddled vehicle according to claim 1, wherein the forwardly extending portion extends outward in the vehicle width direction and downward from an upper part of the upwardly deploying portion, and bends and extends forward from a position with a height of a middle part in an up-down direction of the upwardly deploying portion in a vehicle side view.

12. The saddled vehicle according to claim 1, wherein the forwardly extending portion and the second forwardly extending portion extend from a middle part in an up-down direction of the upwardly deploying portion.

13. The saddled vehicle according to claim 12, wherein the second deploying portion includes an upwardly-downwardly extending portion that extends upwardly and downwardly from the inner bending portion.

14. The saddled vehicle according to claim 1, wherein
an inflator that jets gas into the airbag to deploy the airbag is connected to the airbag, and
a separating mechanism is provided that separates the airbag from the inflator after the airbag is deployed.

15. Rider protection equipment comprising:
rider equipment, worn by a rider riding on a vehicle; and
an airbag, wherein
the airbag is supported by the rider equipment and is located on a rear surface side of a torso of the rider,
the airbag includes an upwardly deploying portion that is deployed upward along a rear surface of the torso of the rider, and a second deploying portion that branches and extends from a portion of the upwardly deploying portion,
the second deploying portion includes either of a forwardly extending portion and a second forwardly extending portion, the forwardly extending portion extending outward in a vehicle width direction from the upwardly deploying portion and then extending forward, the second forwardly extending portion extending forward or forward and outward from the upwardly deploying portion, and
the second deploying portion extends forward through below an arm and an outer lateral side of the torso of the rider grasping a handle for steering, and further covers the torso from a front via an inner bending portion that bends inward in the vehicle width direction.

* * * * *